US012436477B2

(12) United States Patent
Sugawara et al.

(10) Patent No.: US 12,436,477 B2
(45) Date of Patent: Oct. 7, 2025

(54) ELECTROSTATIC IMAGE DEVELOPING TONER, ELECTROSTATIC IMAGE DEVELOPER, AND TONER CARTRIDGE

(71) Applicant: FUJIFILM Business Innovation Corp., Tokyo (JP)

(72) Inventors: Atsushi Sugawara, Kanagawa (JP); Yoshimasa Fujihara, Kanagawa (JP); Daisuke Noguchi, Kanagawa (JP); Shintaro Anno, Kanagawa (JP); Satoshi Miura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 547 days.

(21) Appl. No.: 17/497,144

(22) Filed: Oct. 8, 2021

(65) Prior Publication Data

US 2022/0382176 A1 Dec. 1, 2022

(30) Foreign Application Priority Data

May 25, 2021 (JP) ................................ 2021-087876

(51) Int. Cl.
*G03G 9/087* (2006.01)
*G03G 9/097* (2006.01)
*G03G 15/08* (2006.01)

(52) U.S. Cl.
CPC ............ *G03G 9/087* (2013.01); *G03G 9/097* (2013.01); *G03G 15/0868* (2013.01)

(58) Field of Classification Search
CPC ..... G03G 9/087; G03G 9/097; G03G 15/0868
See application file for complete search history.

(56) References Cited

U.S. PATENT DOCUMENTS

2003/0039910 A1* 2/2003 Shirai .................... G03G 9/081 430/109.4
2007/0166635 A1* 7/2007 Yamamoto .......... G03G 9/0819 430/108.8

(Continued)

FOREIGN PATENT DOCUMENTS

JP 2015011054 A * 1/2015 .......... G03G 9/0806
JP 2017-90829 A 5/2017

(Continued)

OTHER PUBLICATIONS

Extended European Search Report dated May 6, 2022, issued in European Application No. 21205973.7.

(Continued)

*Primary Examiner* — Mark F. Huff
*Assistant Examiner* — Charles Collins Sullivan, IV
(74) *Attorney, Agent, or Firm* — Sughrue Mion, PLLC

(57) ABSTRACT

An electrostatic image developing toner includes a toner particle including an amorphous resin, a crystalline resin, and a release agent. When a cross section of the toner particle is observed, the toner particle satisfies conditions (A1) and (B1) below: Condition (A1): one or more domains of the crystalline resin, the domains having a diameter equal to 10% or more and 40% or less of the maximum diameter of the toner particle, are present in the toner particle, and Condition (B1): one or more domains of the release agent, the domains having a diameter equal to 10% or more and 40% or less of the maximum diameter of the toner particle, are present in the toner particle.

13 Claims, 3 Drawing Sheets

(56) References Cited

U.S. PATENT DOCUMENTS

| | | | | |
|---|---|---|---|---|
| 2008/0102393 | A1* | 5/2008 | Hasegawa | G03G 9/08755 399/258 |
| 2008/0107991 | A1* | 5/2008 | Hamano | G03G 9/08755 399/377 |
| 2010/0183968 | A1* | 7/2010 | Sugawara | G03G 9/0926 399/119 |
| 2011/0151368 | A1 | 6/2011 | Hong et al. | |
| 2015/0362852 | A1* | 12/2015 | Moriya | G03G 9/0804 430/124.1 |
| 2016/0363878 | A1* | 12/2016 | Hama | G03G 9/0825 |
| 2017/0160661 | A1 | 6/2017 | Suzumura et al. | |
| 2017/0307993 | A1 | 10/2017 | Sano et al. | |
| 2020/0363745 | A1 | 11/2020 | Nagata et al. | |

FOREIGN PATENT DOCUMENTS

| | | | |
|---|---|---|---|
| JP | 2017-173395 | A | 9/2017 |
| JP | 2019-168618 | A | 10/2019 |
| JP | 2020-086032 | A | 6/2020 |
| JP | 2020-109500 | A | 7/2020 |

OTHER PUBLICATIONS

Communication issued Nov. 19, 2024 in Japanese application No. 2021-087876.

* cited by examiner

ELECTROSTATIC IMAGE DEVELOPING TONER, ELECTROSTATIC IMAGE DEVELOPER, AND TONER CARTRIDGE

CROSS-REFERENCE TO RELATED APPLICATIONS

This application is based on and claims priority under 35 USC 119 from Japanese Patent Application No. 2021-087876 filed May 25, 2021.

BACKGROUND

(i) Technical Field

The present disclosure relates to an electrostatic image developing toner, an electrostatic image developer, and a toner cartridge.

(ii) Related Art

Methods for visualizing image information, such as electrophotography, have been used in various fields. In electrophotography, an electrostatic image is formed, as image information, on the surface of an image holding member by charging and electrostatic image formation.

Subsequently, a toner image is formed on the surface of the image holding member with a developer including a toner. The toner image is transferred to a recording medium and then fixed to the recording medium. Through the above steps, image information is visualized as an image.

For example, Japanese Laid Open Patent Application Publication No. 2017-173395 discloses an electrostatic latent image developing toner that includes a toner matrix particle including at least a binder resin and a release agent, the binder resin including an amorphous polyester resin and a crystalline resin, wherein the amorphous polyester resin is the principal constituent of the binder resin. Furthermore, the toner matrix particle includes at least a region (A) including a structure constituted by the crystalline resin and the release agent that are in contact with each other, a region (B) including the crystalline resin that forms a filamentous crystal structure and that does not contact with and is separated from the release agent, and a region (C) including the crystalline resin that forms a lamellar crystal structure and that does not contact with and is separated from the release agent.

Japanese Laid Open Patent Application Publication No. 2020-086032 discloses a toner including at least a binder resin, a crystalline polyester resin, a colorant, and a release agent, the toner having a volume average particle size of 4 to 8 μm. Furthermore, a release agent domain is present in a cross sectional image of a toner particle having an equivalent circle diameter of 4 to 8 μm. Moreover, when the ratio of the distance A between the center of gravity of the release agent domain and the center of gravity of the cross section of the toner particle to the equivalent circle diameter of the cross section of the toner particle, that is, [Distance A]/[Equivalent circle diameter], is divided into a number of regions at intervals of 0.05 starting from 0, the number-weighted frequency of the release agent domain becomes the maximum in the region in which the above ratio [Distance A]/[Equivalent circle diameter] is 0.25 or more and 0.3 or less, and the number-weighted frequency of the release agent domain in the region in which the above ratio [Distance A]/[Equivalent circle diameter] is 0.25 or more and 0.3 or less is 20% or more.

Japanese Laid Open Patent Application Publication No. 2020-109500 discloses a toner that includes a toner particle including a binder resin and a wax and an organosilicon polymer particle, wherein the wax is an ester wax, the average major-axis diameter of domains of the wax is 0.03 μm or more and 2.00 μm or less, and the SP value SPw of the wax is 8.59 or more and 9.01 or less.

SUMMARY

Aspects of non-limiting embodiments of the present disclosure relate to an electrostatic image developing toner that may reduce the difference in gloss between the first and tenth images formed on thin recording media and fixed at a high speed and a low temperature, compared with an electrostatic image developing toner that includes only toner particles including an amorphous resin, a crystalline resin, and a release agent, wherein, when cross sections of the toner particles are observed, the toner particles do not satisfy the conditions (A1) and (B1) below.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner including a toner particle including an amorphous resin, a crystalline resin, and a release agent, wherein, when a cross section of the toner particle is observed, the toner particle satisfies conditions (A1) and (B1) below: Condition (A1): one or more domains of the crystalline resin, the domains having a diameter equal to 10% or more and 40% or less of a maximum diameter of the toner particle, are present in the toner particle, and Condition (B1): one or more domains of the release agent, the domains having a diameter equal to 10% or more and 40% or less of the maximum diameter of the toner particle, are present in the toner particle.

BRIEF DESCRIPTION OF THE DRAWINGS

An exemplary embodiment of the present disclosure will be described in detail based on the following figures, wherein.

DETAILED DESCRIPTION

Figure 1:
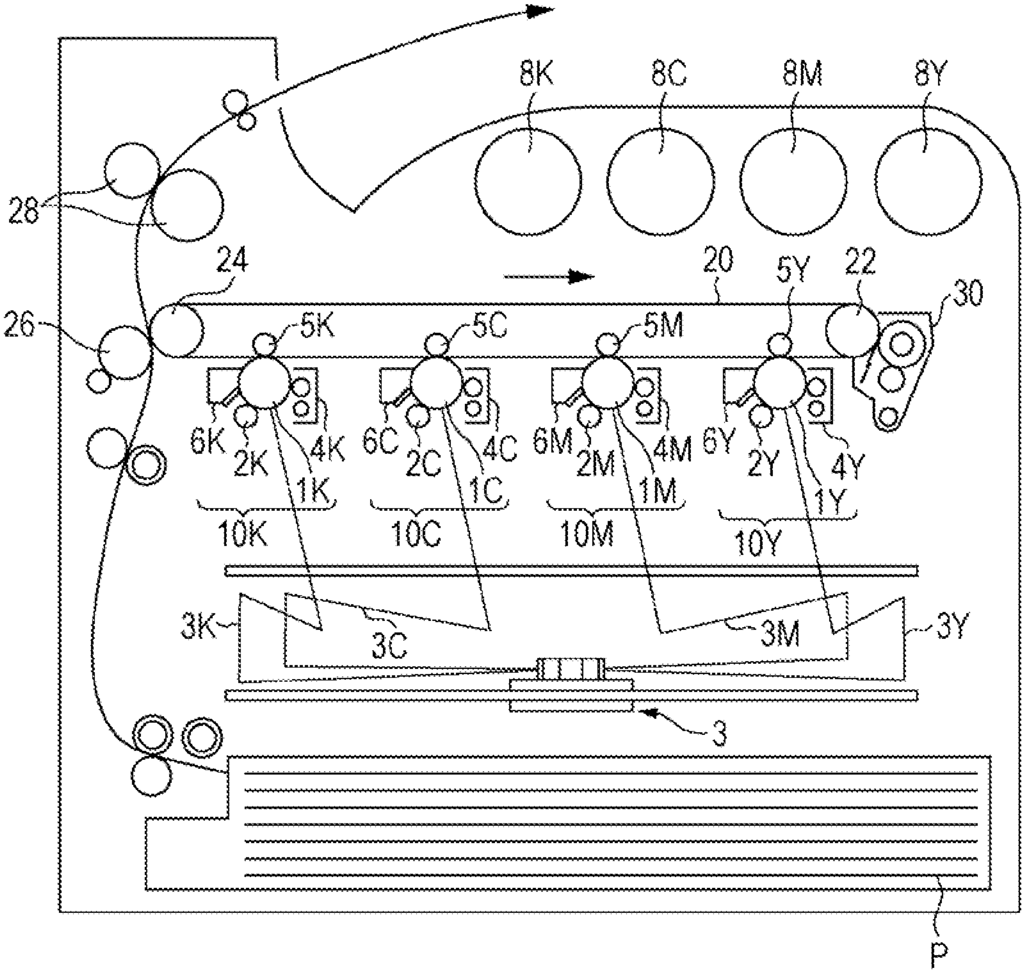
FIG. 1 is a schematic diagram illustrating an example of an image forming apparatus according to an exemplary embodiment.

An exemplary embodiment of the present disclosure is described in detail below.

In the present disclosure, when numerical ranges are described in a stepwise manner, the upper or lower limit of a numerical range may be replaced with the upper or lower limit of another numerical range, respectively.

In the present disclosure, the upper and lower limits of a numerical range may be replaced with the upper and lower limits described in Examples below.

In the present disclosure, in the case where a composition includes plural substances that correspond to a component of the composition, the content of the component in the composition is the total content of the plural substances in the composition unless otherwise specified.

The term "step" used herein refers not only to an individual step but also to a step that is not distinguishable from other steps but achieves the intended purpose of the step.

Electrostatic Image Developing Toner

An electrostatic image developing toner according to the exemplary embodiment (hereinafter, referred to simply as "toner") includes a toner particle including an amorphous resin, a crystalline resin, and a release agent. When a cross section of the toner particle is observed, the toner particle satisfies the conditions (A1) and (B1) below.

Condition (A1): one or more domains of the crystalline resin, the domains having a diameter equal to 10% or more and 40% or less of the maximum diameter of the toner particle, are present in the toner particle.

Condition (B1): one or more domains of the release agent, the domains having a diameter equal to 10% or more and 40% or less of the maximum diameter of the toner particle, are present in the toner particle.

The toner according to the exemplary embodiment may reduce the difference in gloss between the first and tenth images formed on thin recording media and fixed at a high speed and a low temperature. The reasons are presumably as described below.

When a solid image is formed on a thin recording medium (e.g., a paper sheet having a basis weight of 60 $g/m^2$ or less) at a toner deposition density (TMA) of 4.0 $g/m^2$ so as to extend to a position 5 mm from the front end and the image is fixed at a high speed (e.g., a recording medium transport speed of 300 mm/sec or more) and a low fixing temperature (e.g., a fixing temperature of 150° C. or less), inconsistencies in the gloss of the image may occur.

This is because, when the image is fixed at a high speed and a low temperature, it becomes hard to transfer heat to the toner and melt the toner to a sufficient degree during the fixing. In addition, the ease of seepage of the release agent is reduced. This leads to degradation of releasability from the fixing members. In particular, in the case where an image is formed on a thin recording medium and fixed at a high speed and a low temperature, since the fixing rollers have not been heated to a sufficient degree, a sufficient amount of heat is not transferred to the first recording medium. This reduces the ease of seepage of the release agent and consequently increases the likelihood of the recording medium becoming engaged with the fixing members. In contrast, as for the tenth and subsequent recording media, since the fixing members have been heated to a sufficient degree, a sufficient amount of heat is transferred to the recording media and the ease of seepage of the release agent is high. Thus, heat transfers in the first and tenth recording media in different manners, and the degrees of ease at which the toner becomes melted in the first and tenth recording media are different from each other. Consequently, the difference in gloss between the images formed on the first and tenth recording media is likely to occur.

Accordingly, the toner according to the exemplary embodiment includes a toner particle that satisfies the conditions (A1) and (B1).

The condition (A1) means that a large crystalline resin domain is present in the toner particle. When a large crystalline resin domain is present in the toner particle, the ease at which the toner particle becomes melted when an image is fixed is increased.

The condition (B1) means that a large release agent domain is present in the toner particle. When a large release agent domain is present in the toner particle, the ease at which the release agent seeps through the toner particle when an image is fixed is increased.

That is, in the toner particle that satisfies both conditions (A1) and (B1) below, both large crystalline resin domain and large release agent domain are present (see FIG. 3). This increases both ease at which the toner particle becomes melted when an image is fixed and ease at which the release agent seeps through the toner particle when an image is fixed. Consequently, even in the case where an image is formed on a thin recording medium and fixed at a high speed and a low temperature, the toner particle becomes melted to a sufficient degree when the image is fixed. Furthermore, the ease of seepage of the release agent is increased, and releasability from the fixing members is enhanced accordingly. This reduces the inconsistencies in the gloss of the image.

In particular, in the case where domains of the crystalline resin included in a toner particle is large, the toner particle may become dissolved quickly to the inside of the toner particle. That is, it becomes easy to melt the entire toner particle. As a result, the large-diameter release agent becomes melted and readily seeps through the toner particle. Therefore, the toner particle may become melted to a sufficient degree and the release agent may readily seep through the toner particle even in the printing of the first recording medium, in which the fixing members have not been heated to a sufficient degree. This may reduce the difference in gloss between the images formed on the first and tenth recording media.

For the above reasons, the toner according to the exemplary embodiment is considered to reduce the difference in gloss between the first and tenth images formed on thin recording media and fixed at a high speed and a low temperature.

A crystalline resin and a release agent are both crystalline constituents and likely to form domains in the vicinity of each other in the formation of toner particles. Thus, increasing the sizes of both crystalline resin and release agent domains results in an increase in the likelihood of the crystalline resin and release agent domains contacting with each other. Therefore, it has been difficult in the related art to produce toner particles in which both large crystalline resin domains and large release agent domains are present.

Figure 3:
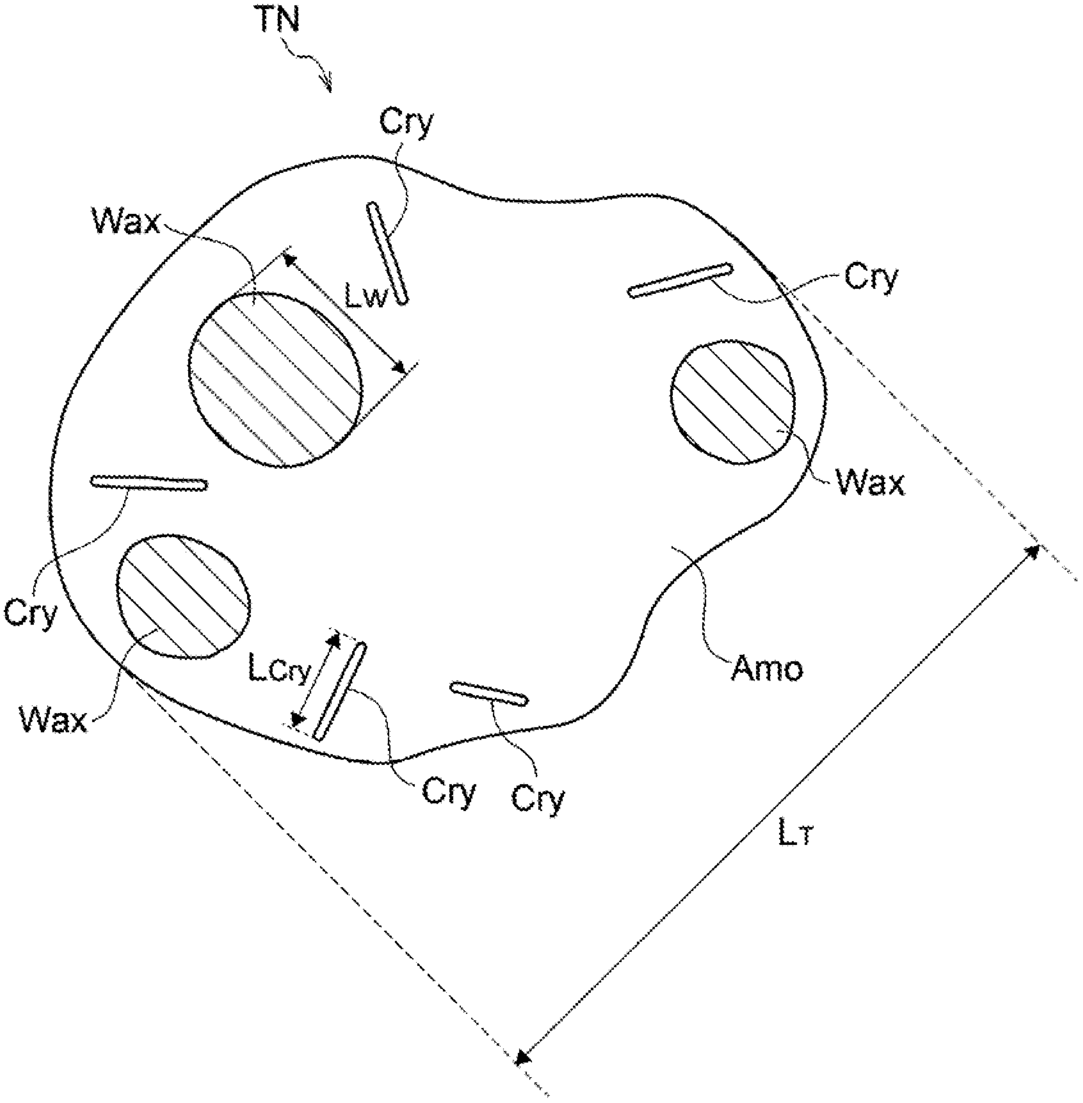
FIG. 3 is a schematic cross-sectional view of a toner particle included in an electrostatic image developing toner according to the exemplary embodiment.

The meanings of the symbols used in FIG. 3 are as follows.

TN: Toner particle

Amo: Amorphous resin

Cry: Crystalline resin

Wax: Release agent $L_T$: Maximum diameter of toner particle $L_{cry}$: Maximum diameter of crystalline resin Lw: Maximum diameter of release agent Details of the toner according to the exemplary embodiment are described below.

The toner according to the exemplary embodiment includes toner particles. The toner may optionally include an external additive.

Toner Particles

The toner particles include an amorphous resin and a crystalline resin that serve as a binder resin. The toner particles may include additives, such as a colorant and a release agent.

Arrangement of Crystalline Resin Domains and Release Agent Domains in Toner Particles When a cross section of each of the toner particles is observed, domains of the crystalline resin and domains of the release agent satisfy the conditions (A1) and (B1) described below.

The domains of the crystalline resin and the domains of the release agent may satisfy the conditions (A2) and (B2) described below in order to reduce the difference in gloss between the first and tenth images.

The domains of the crystalline resin and the domains of the release agent may further satisfy the condition (C1) or (C2) described below in order to reduce the difference in gloss between the first and tenth images.

The proportion of toner particles that satisfy the conditions (A1) and (B1) or the conditions (A2) and (B2) to all the toner particles is 30 number % or more, is more preferably 70 number % or more, is further preferably 80 number % or more, and is particularly preferably 90 number % or more in order to reduce the difference in gloss between the first and tenth images. Ideally, the proportion of toner particles that satisfy the above conditions is 100 number %.

The higher the proportion of toner particles that satisfy the above conditions, the greater the reduction in the difference in gloss between the first and tenth images.

Similarly, in order to reduce the difference in gloss between the first and tenth images, the proportion of toner particles that satisfy the condition (C1) or (C2) described below in addition to the conditions (A1) and (B1) or the conditions (A2) and (B2) to all the toner particles is preferably 30 number % or more, is more preferably 70 number % or more, is further preferably 80 number % or more, and is particularly preferably 90 number % or more. Ideally, the proportion of toner particles that satisfy the above conditions is 100 number %.

Conditions (A1) and (B1)

Condition (A1): one or more domains of the crystalline resin, the domains having a diameter equal to 10% or more and 40% or less of the maximum diameter of the toner particle, are present in the toner particle.

Condition (B1): one or more domains of the release agent, the domains having a diameter equal to 10% or more and 40% or less of the maximum diameter of the toner particle, are present in the toner particle.

Conditions (A2) and (B2)

Condition (A2): a plurality of domains of the crystalline resin, the domains having a diameter equal to 10% or more and 40% or less of the maximum diameter of the toner particle, are present in the toner particle.

Condition (B2): a plurality of domains of the release agent, the domains having a diameter equal to 10% or more and 40% or less of the maximum diameter of the toner particle, are present in the toner particle.

Specifically, the diameter of domains of the crystalline resin is, for example, 0.5 μm or more and 2.0 μm or less.

Specifically, the diameter of domains of the release agent is, for example, 0.5 μm or more and 2.0 μm or less.

Note that the diameter of a crystalline resin or release agent domain is the maximum diameter of the crystalline resin or release agent domain, that is, the maximum length of a straight line segment that connects any two points on the circumference of the crystalline resin or release agent domain.

Note that the maximum diameter of a toner particle is the maximum length of a straight line segment that connects any two points on the circumference of a cross section of the toner particle.

Conditions (C1) and (C2)

Condition (C1): the domains of the crystalline resin are acicular or tabular and the domains of the release agent are circular.

Condition (C2): the domains of the crystalline resin are circular and the domains of the release agent are acicular or tabular.

When domains of one of the crystalline resin and the release agent are acicular or tabular and domains of the other are circular, it becomes easy to increase the diameters of both crystalline resin and release agent domains. Consequently, the difference in gloss between the first and tenth images may be readily reduced.

In particular, in the case where domains of the crystalline resin are large and acicular or tabular, the likelihood of the toner particle becoming melted to the inside of the toner particle when an image is fixed is increased. Furthermore, in such a case, since domains of the release agent are large and circular, the ease of seepage of the release agent is increased. Therefore, when the condition (C1) is satisfied, the difference in gloss between the first and tenth images may be further readily reduced.

On the other hand, in the case where domains of the crystalline resin have a large diameter and are circular and domains of the release agent have a large diameter and are acicular or tabular, the likelihood of the crystalline resin included in the toner particle becoming melted to crush the toner particle when an image is fixed is increased. Since domains of the release agent have a large diameter and are acicular or tabular, the release agent may readily seep through the crushed toner particle in the major-axis direction. Therefore, when the condition (C2) is satisfied, the difference in gloss between the first and tenth images may also be further readily reduced.

The aspect ratio of the acicular or tabular domains (in particular, the aspect ratio of domains of the crystalline resin) is preferably 5 or more and 40 or less and is more preferably 15 or more and 40 or less in order to reduce the difference in gloss between the first and tenth images.

The term "aspect ratio" of an acicular or tabular domain refers to the ratio of the major axis length (i.e., maximum diameter) of the domain to the minor axis length of the domain, that is, [Major axis length]/[Minor axis length].

The major axis length of an acicular or tabular domain is the maximum diameter of the acicular or tabular domain, that is, the maximum length of a straight line segment that connects any two points on the circumference of the domain.

The minor axis length of an acicular or tabular domain is the maximum length of a straight line segment that connects any two points on the circumference of the domain and is perpendicular to an extension of the major axis of the domain.

The circularity of the circular domains (in particular, the circularity of domains of the release agent) is preferably 0.92 or more and 1.00 or less and is more preferably 0.95 or more and 1.00 or less in order to reduce the difference in gloss between the first and tenth images.

The circularity of a domain is defined by the following formula.

$$\text{Circularity}(100/SF2)=4\pi\times(A/I^2) \quad (1)$$

where I represents the perimeter of the domain and A represents the area of the domain.

Method for Observing Cross Section of Toner Particle

The method for observing a cross section of a toner particle in order to determine whether the toner particle satisfies the above conditions is as described below.

A toner particle (or a toner particle including an external additive adhered thereon) is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. The thin specimen is stained with ruthenium tetroxide in a desiccator at 30° C. for 3 hours. A transmission image-mode STEM observation image (acceleration voltage: 30 kV, magnification: 20,000 times) of the stained thin specimen is captured with an ultra-high-resolution field-emission scanning electron microscope (FE-SEM) "S-4800" produced by Hitachi High-Tech Corporation.

In the toner particle, a crystalline polyester resin and a release agent are distinguished from one another on the basis of contrast and shape. In the SEM image, since the binder resin other than the release agent includes a number of double bond portions and stained with ruthenium tetroxide, a release agent portion and a resin portion other than the release agent can be distinguished from each other.

Specifically, by ruthenium staining, a release agent domain is stained most slightly, a crystalline resin (e.g., a crystalline polyester resin) is stained second most slightly, and an amorphous resin (e.g., an amorphous polyester resin) is stained most intensely. When contrast is adjusted appropriately, a release agent appears as a white domain, an amorphous resin appears as a black domain, and a crystalline resin appears as a light gray domain.

An image analysis of crystalline resin domains stained with ruthenium is conducted to determine whether the toner particle satisfies the above conditions.

For determining the proportion of toner particles that satisfy the above conditions, 100 toner particles are observed and the proportion of toner particles that satisfy the above conditions is calculated.

While the SEM image contains cross sections of toner particles having various sizes, cross sections of specific toner particles having a diameter that is 85% or more of the volume average particle size of the toner particles are selected and used as toner particles that are to be observed. The diameter of a cross section of a toner particle is the maximum length of a line segment that connects any two points on the circumference of the cross section of the toner particle (i.e., major axis length).

Binder Resin

Examples of the binder resin include vinyl resins that are homopolymers of the following monomers or copolymers of two or more monomers selected from the following monomers: styrenes, such as styrene, para-chlorostyrene, and α-methylstyrene; (meth)acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the binder resin further include non-vinyl resins, such as epoxy resins, polyester resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

In particular, an amorphous resin and a crystalline resin may be used as a binder resin.

The mass ratio between the amorphous resin and the crystalline resin (crystalline resin/amorphous resin) is preferably 3/97 or more and 50/50 or less and is more preferably 7/93 or more and 30/70 or less.

The term "amorphous resin" used herein refers to a resin that does not exhibit a distinct endothermic peak but only a step-like endothermic change in thermal analysis conducted using differential scanning calorimetry (DSC), that is solid at normal temperature, and that undergoes heat plasticization at a temperature equal to or higher than the glass transition temperature.

The term "crystalline resin" used herein refers to a resin that exhibits a distinct endothermic peak instead of a step-like endothermic change in DSC.

Specifically, for example, an crystalline resin is a resin that exhibits an endothermic peak with a half-width of 10° C. or less at a heating rate of 10° C./min. An amorphous resin is a resin the half-width of which is more than 10° C. or a resin that does not exhibit a distinct endothermic peak.

The amorphous resin is described below.

Examples of the amorphous resin include the amorphous resins known in the related art, such as an amorphous polyester resin, an amorphous vinyl resin (e.g., a styrene acrylic resin), an epoxy resin, a polycarbonate resin, and a polyurethane resin. Among the above amorphous resins, an amorphous polyester resin and an amorphous vinyl resin (in particular, a styrene acrylic resin) are preferable, and an amorphous polyester resin is more preferable.

An amorphous polyester resin and a styrene acrylic resin may be used in combination with each other as an amorphous resin. An amorphous resin including an amorphous polyester resin segment and a styrene acrylic resin segment may be used as an amorphous resin.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed. In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where the monomers used in the copolymerization reaction have low miscibility with each other, a condensation reaction of the monomers with an acid or alcohol that is to undergo a polycondensation reaction with the monomers may be performed in advance and subsequently polycondensation of the resulting polymers with the other components may be performed.

The amorphous polyester resin may be a modified amorphous polyester resin as well as an unmodified amorphous polyester resin. The modified amorphous polyester resin is an amorphous polyester resin including a bond other than an ester bond or an amorphous polyester resin including a resin component other than a polyester, the resin component being bonded to the amorphous polyester resin with a covalent bond, an ionic bond, or the like. Examples of the modified amorphous polyester resin include a terminal-modified amorphous polyester resin produced by reacting an amorphous polyester resin having a functional group, such as an isocyanate group, introduced at the terminal with an active hydrogen compound.

The proportion of the amorphous polyester resin to the entire binder resin is preferably 60% by mass or more and 98% by mass or less, is more preferably 65% by mass or more and 95% by mass or less, and is further preferably 70% by mass or more and 90% by mass or less.

Styrene Acrylic Resin

The styrene acrylic resin is a copolymer produced by copolymerization of at least a monomer having a styrene skeleton (hereinafter, such a monomer is referred to as "styrene-based monomer") with a monomer having a (meth) acryl group or preferably a (meth)acryloxy group (hereinafter, such a monomer is referred to as "(meth)acryl-based monomer). Examples of the styrene acrylic resin include a copolymer of a styrene monomer with a (meth)acrylic acid ester monomer.

Note that an acrylic resin portion of the styrene acrylic resin is a partial structure produced by polymerization of either or both of an acrylic monomer and a methacrylic monomer. Note that the term "(meth)acryl" used herein refers to both "acryl" and "methacryl".

Examples of the styrene-based monomer include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The above styrene-based monomers may be used alone or in combination of two or more.

Examples of the (meth)acryl-based monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth) acrylate, stearyl (meth) acrylate, cyclohexyl (meth) acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The above (meth) acryl-based monomers may be used alone or in combination of two or more.

The polymerization ratio between the styrene-based monomer and the (meth)acryl-based monomer, that is, Styrene-based monomer:(Meth)acryl-based monomer, may be 70:30 to 95:5 by mass.

The styrene acrylic resin may include a crosslinked structure. The styrene acrylic resin including a crosslinked structure may be produced by, for example, copolymerization of the styrene-based monomer, the (meth)acryl-based monomer, and a crosslinkable monomer. The crosslinkable monomer may be, but not limited to, a difunctional or higher (meth)acrylate.

The method for preparing the styrene acrylic resin is not limited. For example, solution polymerization, precipitation polymerization, suspension polymerization, bulk polymerization, and emulsion polymerization may be used. The polymerization reaction may be conducted by any suitable process known in the related art, such as a batch process, a semi-continuous process, or a continuous process.

The proportion of the styrene acrylic resin to the entire binder resin is preferably 0% by mass or more and 20% by mass or less, is more preferably 1% by mass or more and 15% by mass or less, and is further preferably 2% by mass or more and 10% by mass or less.

Amorphous Resin Including Amorphous Polyester Resin Segment and Styrene Acrylic Resin Segment (hereinafter, such an amorphous resin is referred to as "hybrid amorphous resin")

A hybrid amorphous resin is an amorphous resin that includes an amorphous polyester resin segment and a styrene acrylic resin segment that are chemically bonded to each other.

Examples of the hybrid amorphous resin include a resin constituted by a backbone composed of a polyester resin and a side chain composed of a styrene acrylic resin chemically bonded to the backbone; a resin constituted by a backbone composed of a styrene acrylic resin and a side chain composed of a polyester resin chemically bonded to the backbone; a resin that includes a backbone composed of a polyester resin and a styrene acrylic resin chemically bonded to each other; and a resin constituted by a backbone composed of a polyester resin and a styrene acrylic resin chemically bonded to each other and at least one of a side chain composed of a polyester resin chemically bonded to the backbone and a side chain composed of a styrene acrylic resin chemically bonded to the backbone.

The amorphous polyester resin and styrene acrylic resin included in the above segments are as described above; descriptions thereof are omitted herein.

The ratio of the total amount of the polyester resin segment and the styrene acrylic resin segment to the total amount of the hybrid amorphous resin is preferably 80% by mass or more, is more preferably 90% by mass or more, is further preferably 95% by mass or more, and is most preferably 100% by mass.

In the hybrid amorphous resin, the proportion of the amount of the styrene acrylic resin segment to the total amount of the polyester resin segment and the styrene acrylic resin segment is preferably 20% by mass or more and 60% by mass or less, is more preferably 25% by mass or more and 55% by mass or less, and is further preferably 30% by mass or more and 50% by mass or less.

The hybrid amorphous resin may be produced by any of the methods (i) to (iii) below.

(i) condensation polymerization of a polyhydric alcohol with a polyvalent carboxylic acid is performed to prepare a polyester resin segment, and addition polymerization of a monomer constituting a styrene acrylic resin segment to the polyester resin segment is performed.

(ii) addition polymerization of an addition polymerizable monomer is performed to prepare a styrene acrylic resin segment and, subsequently, condensation polymerization of a polyhydric alcohol with a polyvalent carboxylic acid is performed.

(iii) condensation polymerization of a polyhydric alcohol with a polyvalent carboxylic acid and addition polymerization of an addition polymerizable monomer are performed simultaneously.

The proportion of the hybrid amorphous resin to the entire binder resin is preferably 60% by mass or more and 98% by mass or less, is more preferably 65% by mass or more and 95% by mass or less, and is further preferably 70% by mass or more and 90% by mass or less.

The properties of the amorphous resin are described below.

The glass transition temperature Tg of the amorphous resin is preferably 50° C. or more and 80° C. or less and is more preferably 50° C. or more and 65° C. or less.

The glass transition temperature of the amorphous resin is determined from a differential scanning calorimetry (DSC) curve obtained by DSC. More specifically, the glass transition temperature of the amorphous resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous resin is preferably 5,000 or more and 1,000,000 or less and is more preferably 7,000 or more and 500,000 or less.

The number average molecular weight Mn of the amorphous resin may be 2,000 or more and 100,000 or less.

The molecular weight distribution index Mw/Mn of the amorphous resin is preferably 1.5 or more and 100 or less and is more preferably 2 or more and 60 or less.

The weight average molecular weight and number average molecular weight of the amorphous resin are determined by gel permeation chromatography (GPC). Specifically, the molecular weights of the amorphous resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight average molecular weight and number average molecular weight of the amorphous resin are determined on the basis of the results of the measurement using a molecular-weight calibration curve based on monodisperse polystyrene standard samples.

The crystalline resin is described below.

Examples of the crystalline resin include the crystalline resins known in the related art, such as a crystalline polyester resin and a crystalline vinyl resin (e.g., a polyalkylene resin or a long-chain alkyl (meth)acrylate resin). Among these, a crystalline polyester resin may be used in consideration of the mechanical strength and low-temperature fixability of the toner.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The crystalline polyester resin may be produced by any suitable method known in the related art similarly to, for example, the amorphous polyester resin.

The crystalline polyester resin may be a polymer of an α,ω-linear aliphatic dicarboxylic acid with an α,ω-linear aliphatic diol.

Since a polymer of an α,ω-linear aliphatic dicarboxylic acid with an α,ω-linear aliphatic diol is highly compatible with an amorphous polyester resin, the difference in gloss between the first and tenth images may be further readily reduced.

The α,ω-linear aliphatic dicarboxylic acid may be an α,ω-linear aliphatic dicarboxylic acid that includes two carboxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic dicarboxylic acid include succinic acid, glutaric acid, adipic acid, 1,6-hexanedicarboxylic acid (common name: suberic acid), 1,7-heptanedicarboxylic acid (common name: azelaic acid), 1,8-octanedicarboxylic acid (common name: sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

The above α,ω-linear aliphatic dicarboxylic acids may be used alone or in combination of two or more.

The α,ω-linear aliphatic diol may be an α,ω-linear aliphatic diol that includes two hydroxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The above α,ω-linear aliphatic diols may be used alone or in combination of two or more.

The polymer of the α,ω-linear aliphatic dicarboxylic acid with the α,ω-linear aliphatic diol is preferably a polymer of at least one dicarboxylic acid selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid with at least one diol selected from the group consisting of 1,6-hexanediol, 1,7-heptanediol, 1,8-octanediol, 1,9-nonanediol, and 1,10-decanediol, in order to reduce the difference in gloss between the first and tenth images. In particular, a polymer of 1,10-decanedicarboxylic acid with 1,6-hexanediol is more preferable.

The proportion of the crystalline polyester resin to the entire binder resin is preferably 1% by mass or more and 20% by mass or less, is more preferably 2% by mass or more and 15% by mass or less, and is further preferably 3% by mass or more and 10% by mass or less.

The properties of the crystalline resin are described below.

The melting temperature of the crystalline resin is preferably 50° C. or more and 100° C. or less, is more preferably 55° C. or more and 90° C. or less, and is further preferably 60° C. or more and 85° C. or less.

The melting temperature of the crystalline resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline resin may have a weight average molecular weight Mw of 6,000 or more and 35,000 or less.

The content of the binder resin in the entire toner particles is preferably 40% by mass or more and 95% by mass or less, is more preferably 50% by mass or more and 90% by mass or less, and is further preferably 60% by mass or more and 85% by mass or less.

Colorant

Examples of the colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. Plural types of colorants may be used in combination.

The content of the colorant in the entire toner particles is preferably 1% by mass or more and 30% by mass or less and is more preferably 3% by mass or more and 15% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The melting temperature of the release agent is preferably 50° C. or more and 110° C. or less and is more preferably 60° C. or more and 100° C. or less.

The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

In particular, the melting temperature of the release agent is preferably 65° C. or more and 95° C. or less and is more preferably 67° C. or more and 91° C. or less. Using a release agent having a melting temperature of 65° C. or more and 95° C. or less increases the likelihood of the release agent particles having a large diameter and a spherical shape and consequently increases the likelihood of the toner particles satisfying the conditions (B1), (B2), and (C1).

The release agent having a melting temperature of 65° C. or more and 95° C. or less may be an ester wax. The use of an ester wax also increases the likelihood of the release agent particles having a large diameter and a spherical shape and consequently increases the likelihood of the toner particles satisfying the conditions (B1), (B2), and (C1).

Using an paraffin wax (in particular, an ethylene wax) as a release agent having a melting temperature of 65° C. or more and 95° C. or less increases the likelihood of the release agent domains having a large diameter and an acicular or tabular shape and consequently increases the likelihood of the toner particles satisfying the condition (C2).

The term "ester wax" used herein refers to a wax having an ester linkage. The ester wax may be any of a monoester, a diester, a triester, and a tetraester. The natural and synthesis ester waxes known in the related art may be used.

Examples of the ester wax include an ester of a higher fatty acid (e.g., a fatty acid having 10 or more carbon atoms) with a monovalent or polyvalent aliphatic alcohol (e.g., an aliphatic alcohol having 8 or more carbon atoms).

Examples of the ester wax include an ester of a higher fatty acid, such as caprylic acid, capric acid, lauric acid, myristic acid, palmitic acid, stearic acid, arachidic acid, behenic acid, or oleic acid, with an alcohol (e.g., a monohydric alcohol, such as methanol, ethanol, propanol, isopropanol, butanol, capryl alcohol, lauryl alcohol, myristyl alcohol, cetyl alcohol, stearyl alcohol, or oleyl alcohol; or a polyhydric alcohol, such as glycerin, ethylene glycol, propylene glycol, sorbitol, or pentaerythritol). Specific examples thereof include a carnauba wax, a rice bran wax, a candelilla wax, a jojoba oil, a Japan wax, a beeswax, a Chinese wax, lanoline, and a montanic ester wax.

Examples of the paraffin wax include a polyethylene wax and a polypropylene wax.

The content of the release agent in the entire toner particles is preferably 4% by mass or more and 20% by mass or less and is more preferably 6% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties, Etc. of Toner Particles

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a colorant and a release agent and by a coating layer including the binder resin.

The volume average diameter D50v of the toner particles is preferably 2 μm or more and 15 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5%-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The toner particles preferably have an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO \cdot SiO_2$ particles, $K_2O \cdot (TiO_2)_n$ particles, $Al_2O_3 \cdot 2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate (PMMA), or a melamine resin; and particles of a cleaning lubricant, such as a metal salt of a higher fatty acid, such as zinc stearate, or a fluorine-contained resin.

The amount of the external additive used is, for example, preferably 0.01% by mass or more and 5% by mass or less and is more preferably 0.01% by mass or more and 2.0% by mass or less of the amount of the toner particles.

Method for Producing Toner

The method for producing the toner according to the exemplary embodiment is described below.

The toner according to the exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used.

Among these methods, aggregation coalescence may be used for preparing the toner particles, in order to form crystalline resin domains satisfying the above conditions.

Specifically, in the case where, for example, aggregation coalescence is used in order to prepare the toner particles, the toner particles are prepared by the following steps:

preparing an amorphous resin particle dispersion liquid in which particles of an amorphous resin are dispersed, a crystalline resin particle dispersion liquid in which particles of a crystalline resin are dispersed, and a release agent particle dispersion liquid in which particles of a release agent are dispersed (hereinafter, this step is referred to as "particle dispersion liquid preparation step");

causing the amorphous resin particles, the crystalline resin particles, the release agent particles, and, as needed, colorant particles or the like to aggregate together in a dispersion liquid that is a mixture of the amorphous resin particle dispersion liquid, the crystalline resin particle dispersion liquid, the release agent particle dispersion liquid, and, as needed, a colorant particle dispersion liquid, in order to form first aggregated particles (hereinafter, this step is referred to as "first aggregated particle formation step);

after an aggregated particle dispersion liquid in which the first aggregated particles are dispersed has been prepared, performing an operation in which the above aggregated particle dispersion liquid is mixed with the amorphous resin particle dispersion liquid and the crystalline resin particle dispersion liquid or with a liquid mixture of the amorphous resin particle dispersion liquid and the crystalline resin particle dispersion liquid to cause aggregation such that the amorphous resin particles and the crystalline resin particles are further deposited on the surfaces of the first aggregated particles, the operation being repeated one or more times, in order to form second aggregated particles (hereinafter, this step is referred to as "second aggregated particle formation step);

after an aggregated particle dispersion liquid in which the second aggregated particles are dispersed has been prepared, mixing the above aggregated particle dispersion liquid with the amorphous resin particle dispersion liquid to cause aggregation such that the amorphous resin particles are deposited on the surfaces of the second aggregated particles, in order to form third aggregated particles (hereinafter, this step is referred to as "third aggregated particle formation step); and heating the resulting aggregated particle dispersion liquid in which the third aggregated particles are dispersed to perform fusion and coalescence of the aggregated particles, subjecting the resulting first coalesced particles to rapid cooling, reheating, and slow cooling, performing fusion and coalescence of the resulting first cooled particles, and cooling the resulting second coalesced particles to form second cooled particles (hereinafter, this step is referred to as "fusion and coalescence step").

Each of the above steps is described below in detail.

Hereinafter, a method for preparing toner particles including a colorant and a release agent is described. However, it should be noted that the colorant is optional. It is needless to say that additives other than a colorant may be used.

Resin Particle Dispersion Liquid Preparation Step

First, resin particle dispersion liquids (i.e., an amorphous resin particle dispersion liquid and a crystalline resin particle dispersion liquid) in which particles of different resins that serve as a binder resin are dispersed are prepared. Furthermore, for example, a colorant particle dispersion liquid in which particles of a colorant are dispersed and a release agent particle dispersion liquid in which particles of a release agent are dispersed are prepared.

The resin particle dispersion liquid is prepared by, for example, dispersing resin particles in a dispersion medium using a surfactant.

Examples of the dispersion medium used for preparing the resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the resin particle dispersion liquid by, for example, phase-inversion emulsification.

Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform conversion of resin (i.e., phase inversion) from W/O to O/W, form a discontinuous phase, and disperse the resin in the aqueous medium in the form of particles.

The volume average diameter of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume average diameter of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

The content of the resin particles included in the resin particle dispersion liquid is, for example, preferably 5% by mass or more and 50% by mass or less and is more preferably 10% by mass or more and 40% by mass or less.

The colorant particle dispersion liquid, the release agent particle dispersion liquid, and the like are also prepared as in the preparation of the resin particle dispersion liquid. In other words, the above-described specifications for the volume average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release agent particles dispersed in the release agent particle dispersion liquid.

First Aggregated Particle Formation Step

The amorphous resin particle dispersion liquid and the crystalline resin particle dispersion liquid are mixed with the colorant particle dispersion liquid and the release agent particle dispersion liquid.

In the resulting mixed dispersion liquid, heteroaggregation of the amorphous resin particles and the crystalline resin particles with the colorant particles and the release agent particles is performed in order to form first aggregated particles including the amorphous resin particles, the crystalline resin particles, the colorant particles, and the release agent particles, the first aggregated particles having a diameter close to that of the intended toner particles.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to the glass transition temperature of the amorphous resin particles (specifically, e.g., [Glass transition temperature of the amorphous resin particles−30° C.] or more and [the Glass transition temperature−10° C.] or less), and thereby the particles dispersed in the mixed dispersion liquid are caused to aggregate together to form first aggregated particles.

In the first aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid as a dispersant. In particular, using a metal complex as a flocculant reduces the amount of surfactant used and, as a result, charging characteristics may be enhanced.

An additive capable of forming a complex or a bond similar to a complex with the metal ions contained in the flocculant may optionally be used. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelating agent used is, for example, preferably 0.01 parts by mass or more and 5.0 parts by mass or less and is more preferably 0.1 parts by mass or more and less than 3.0 parts by mass relative to 100 parts by mass of the amorphous resin particles.

Second Aggregated Particle Formation Step

After an aggregated particle dispersion liquid in which the first aggregated particles are dispersed has been prepared, the above aggregated particle dispersion liquid is mixed with the amorphous resin particle dispersion liquid and the crystalline resin particle dispersion liquid. Alternatively, the above aggregated particle dispersion liquid may be mixed with a liquid mixture of the amorphous resin particle dispersion liquid and the crystalline resin particle dispersion liquid.

In the dispersion liquid containing the first aggregated particles, the amorphous resin particles, and the crystalline resin particles dispersed therein, aggregation is performed such that the amorphous resin particles and the crystalline resin particles are deposited on the surfaces of the first aggregated particles.

Specifically, for example, when the size of the first aggregated particles has reached the intended particle size in the first aggregated particle formation step, the amorphous resin particle dispersion liquid and the crystalline resin particle dispersion liquid are added to the first aggregated particle dispersion liquid. The resulting dispersion liquid is heated at a temperature equal to or less than the glass transition temperature of the amorphous resin particles.

The above aggregation operation is repeated one or more times in order to form second aggregated particles.

Third Aggregated Particle Formation Step

After an aggregated particle dispersion liquid in which the second aggregated particles are dispersed has been prepared, the above aggregated particle dispersion liquid is mixed with the amorphous resin particle dispersion liquid.

In a dispersion liquid in which the second aggregated particles and the amorphous resin particles are dispersed, aggregation is performed such that the amorphous resin particles are deposited on the surfaces of the second aggregated particles.

Specifically, for example, when the size of the second aggregated particles has reached the intended particle size in the second aggregated particle formation step, the amorphous resin particle dispersion liquid is added to the second aggregated particle dispersion liquid. The resulting dispersion liquid is heated at a temperature equal to or less than the glass transition temperature of the amorphous resin particles.

Subsequently, the pH of the dispersion liquid is adjusted in order to stop the aggregation reaction.

Fusion and Coalescence Step

A third aggregated particle dispersion liquid in which the third aggregated particles are dispersed is heated to, for example, a temperature equal to or higher than the glass transition temperature of the amorphous resin particles (e.g., [Glass transition temperature of the amorphous resin particles+10° C.] or more and [the Glass transition temperature+30° C.] or less) in order to perform fusion and coalescence of the aggregated particles. Hereby, toner particles are formed.

When the fusion and coalescence of the aggregated particles are performed by heating, first, the temperature is increased to a temperature of [Melting temperature of the crystalline resin] or more and [the Melting temperature+20° C.] or less, and holding is then performed. Subsequently, while the state in which the release agent particles are dispersed in the third aggregated particles is maintained, fusion of the crystalline resin particles is performed in order to prepare first coalesced particles.

Subsequently, the temperature is reduced slowly (e.g., at a cooling rate of 0.7° C./min or less) to a temperature of [Melting temperature of the crystalline resin−50° C.] or more and [the Melting temperature−5° C.] or less. Then, holding is performed to cause the growth of domains of the crystalline resin. Hereby, first cooled particles are prepared.

Then, the temperature is increased to the fusion-coalescence temperature (i.e., a temperature equal to or higher than the glass transition temperature of the amorphous resin). Subsequently, holding is performed to cause fusion of the release agent particles. Hereby, second coalesced particles are prepared.

The above operations enable the fusion portions of the crystalline resin particles and the fusion portions of the release agent particles to be separated from each other.

Subsequently, the temperature is reduced slowly (e.g., at a cooling rate of 0.7° C./min or less) to 40° C. or less in order to cause the crystalline resin domains and the release agent domains to be grown so as not to contact with each other. Hereby, second cooled particles are prepared.

Toner particles that satisfy the conditions (A1) and (B1) or the conditions (A2) and (B2) are prepared through the above-described steps. Specifically, the above-described operations make it easy to produce toner particles that satisfy the condition (C1), where domains of the crystalline resin are acicular or tabular and domains of the release agent are circular.

Toner particles that satisfy the condition (C2), where domains of the crystalline resin are circular and domains of the release agent are acicular or tabular, may be produced by, for example, the following operations.

When the fusion and coalescence of the aggregated particles are performed by heating, first, the temperature is increased to a temperature of [Melting temperature of the crystalline resin] or more and [the Melting temperature+20° C.] or less, and holding is then performed. Subsequently, while the state in which the release agent particles are dispersed in the third aggregated particles is maintained, fusion of the crystalline resin particles is performed.

Subsequently, the temperature is reduced rapidly (e.g., at a cooling rate of 1° C./min or more and 4° C./min or less) to a temperature of [Melting temperature of the crystalline resin−50° C.] or more and [the Melting temperature−10° C.] or less in order to bring the crystalline resin into a supercooled state. After the crystalline resin has been supercooled, holding is performed at a temperature of [Melting temperature of the crystalline resin−50° C.] or more and [the Melting temperature−10° C.] or less in order to allow the crystalline resin to form a lamellar structure. This enables formation of circular crystalline resin domains.

The above operations enable formation of acicular or tabular release agent domains. Note that, if the supercooling is performed at an excessively high cooling rate, the diameter of the release agent domains may be reduced. That is, small-diameter release agent domains may be formed.

After the completion of the fusion-coalescence step, the toner particles formed in the solution are subjected to any suitable cleaning step, solid-liquid separation step, and drying step that are known in the related art in order to obtain dried toner particles.

In the cleaning step, the toner particles may be subjected to displacement washing using ion-exchange water to a sufficient degree from the viewpoint of electrification characteristics. Examples of a solid-liquid separation method used in the solid-liquid separation step include, but are not limited to, suction filtration and pressure filtration from the viewpoint of productivity. Examples of a drying method used in the drying step include, but are not limited to, freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to the exemplary embodiment includes at least the toner according to the exemplary embodiment.

The electrostatic image developer according to the exemplary embodiment may be a single component developer including only the toner according to the exemplary embodiment or may be a two-component developer that is a mixture of the toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin.

The coat resin and the matrix resin may optionally include additives, such as conductive particles.

Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner: carrier=1:100 to 30:100 and is more preferably 3:100 to 20:100.

Image Forming Apparatus and Image Forming Method

An image forming apparatus and an image forming method according to the exemplary embodiment are described below.

The image forming apparatus according to the exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to the exemplary embodiment.

The image forming apparatus according to the exemplary embodiment uses an image forming method (image forming method according to the exemplary embodiment) including charging the surface of the image holding member; forming an electrostatic image on the charged surface of the image holding member; developing the electrostatic image formed on the surface of the image holding member with the electrostatic image developer according to the exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including the electrostatic image developer according to the exemplary embodiment and the developing unit.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt 20 that serves as an intermediate transfer body runs above (in FIG. 1) and extends over the units 10Y, 10M, 10C, and 10K. The intermediate transfer belt 20 is wound around a drive roller 22 and a support roller 24 arranged to contact with the inner surface of the intermediate transfer belt 20, which are spaced from each other in a direction from left to right in FIG. 1, and runs clockwise in FIG. 1, that is, in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer body-cleaning device 30 is disposed so as to contact with the image-carrier-side surface of the intermediate transfer belt 20 and to face the drive roller 22.

Developing devices (i.e., developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs. Note that components of the second to fourth units 10M, 10C, and 10K which are equivalent to the above-described components of the first unit 10Y are denoted with reference numerals including magenta (M), cyan (C), or black (K) instead of yellow (Y), and the descriptions of the second to fourth units 10M, 10C, and 10K are omitted.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the cleaning unit) 6Y that removes a toner remaining on the surface of the photosensitive member 1Y after the first transfer.

The first transfer roller 5Y is disposed so as to contact with the inner surface of the intermediate transfer belt 20 and to face the photosensitive member 1Y. Each of the first transfer rollers 5Y, 5M, 5C, and 5K is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam 3Y, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). The laser beam 3Y is impinged on the photosensitive layer formed in the surface of the photosensitive member 1Y. As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is visualized (i.e., developed) in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, for example, in the first unit 10Y, +10 μA by a controller (not illustrated).

The toner particles remaining on the photosensitive member 1Y are removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

Subsequently, the recording paper P is transported into a nip part of the fixing device (example of the fixing unit) 28 at which a pair of fixing rollers contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge and Toner Cartridge

A process cartridge according to the exemplary embodiment is described below.

The process cartridge according to the exemplary embodiment includes a developing unit that includes the electrostatic image developer according to the exemplary embodiment and develops an electrostatic image formed on the surface of an image holding member with the electrostatic image developer to form a toner image. The process cartridge according to the exemplary embodiment is detachably attachable to an image forming apparatus.

The structure of the process cartridge according to the exemplary embodiment is not limited to the above-described one. The process cartridge according to the exemplary embodiment may further include, in addition to the developing device, at least one unit selected from an image holding member, a charging unit, an electrostatic image formation unit, a transfer unit, etc.

An example of the process cartridge according to the exemplary embodiment is described below, but the process cartridge is not limited thereto. Hereinafter, only components illustrated in FIG. 2 are described; others are omitted.

Figure 2:
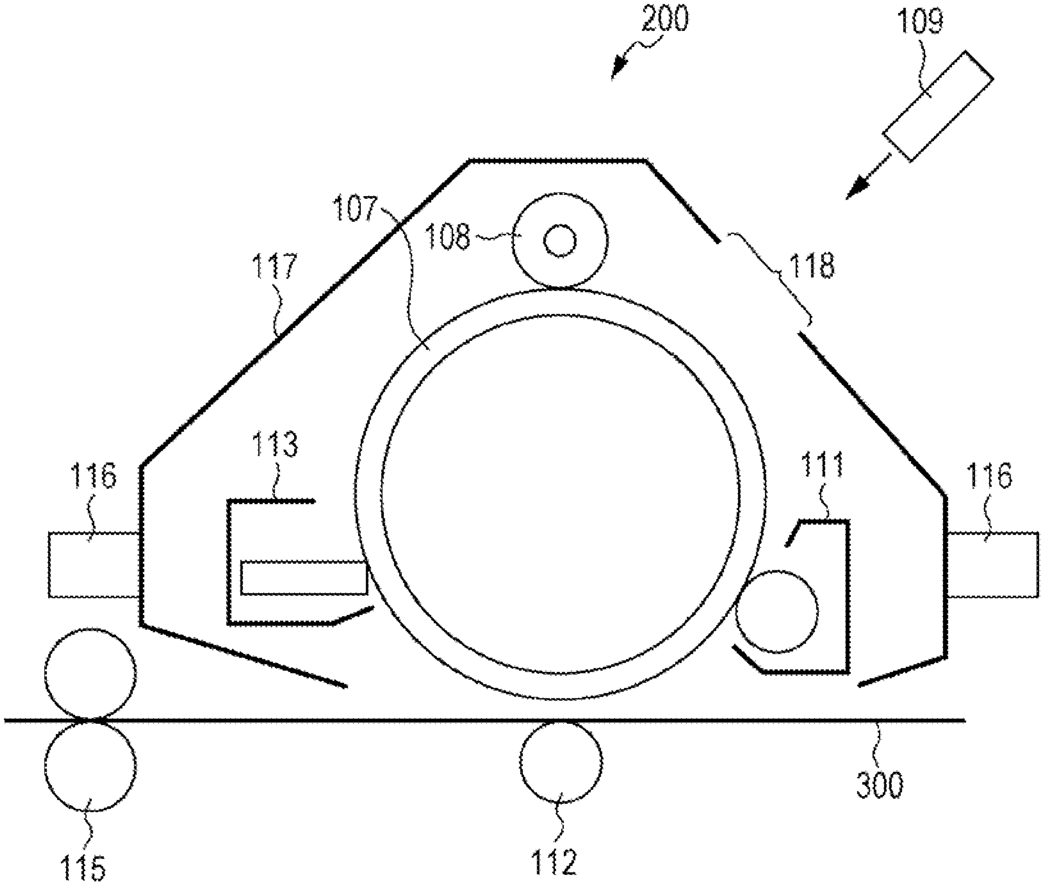
FIG. 2 is a schematic diagram illustrating an example of a process cartridge according to the exemplary embodiment.

FIG. 2 schematically illustrates the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

A toner cartridge according to the exemplary embodiment is described below.

The toner cartridge according to the exemplary embodiment is a toner cartridge that includes the toner according to the exemplary embodiment and is detachably attachable to an image forming apparatus. The toner cartridge includes a replenishment toner that is to be supplied to the developing unit disposed inside an image forming apparatus.

The image forming apparatus illustrated in FIG. 1 is an image forming apparatus that includes the toner cartridges 8Y, 8M, 8C, and 8K detachably attached to the image forming apparatus. Each of the developing devices 4Y, 4M, 4C, and 4K is connected to a specific one of the toner cartridges which corresponds to the color of the developing device with a toner supply pipe (not illustrated). When the amount of toner contained in a toner cartridge is small, the toner cartridge is replaced.

EXAMPLES

Details of the exemplary embodiment are described further specifically with reference to Examples and Comparative examples below. The exemplary embodiment is not limited to Examples below. Hereinafter, the terms "part" and "%" used for representing quantity are on a mass basis unless otherwise specified.

Preparation of Amorphous Resin

Preparation of Amorphous Polyester Resin (A)

Terephthalic acid: 70 parts
Fumaric acid: 30 parts
Ethylene glycol: 41 parts
1,5-Pentanediol: 48 parts The above materials are charged into a flask having a volume of 5 liter which is equipped with a stirring apparatus, a nitrogen introduction tube, a temperature sensor, and a fractionating column. Subsequently, the temperature is increased to 220° C. over 1 hour under a stream of nitrogen gas. Then, 1 part of titanium tetraethoxide is added to the flask relative to 100 parts of the total amount of the above materials. While the product water is removed by distillation, the temperature is then increased to 240° C. over 0.5 hours and a dehydration condensation reaction is continued for 1 hour at 240° C. Subsequently, the product of the reaction is cooled. Hereby, an amorphous polyester resin (A) having a weight average molecular weight of 96,000 and a glass transition temperature of 61° C. is synthesized.

Preparation of Amorphous Resin Particle Dispersion Liquid

Preparation of Amorphous Polyester Resin Particle Dispersion Liquid (A1)

Into a container equipped with a temperature control device and a nitrogen purging device, 40 parts of ethyl acetate and 25 parts of 2-butanol are charged. After the resulting mixture has been formed into a mixed solvent, 100 parts of the amorphous polyester resin (A) is gradually charged into the container to form a solution. To the solution, a 10% aqueous ammonia solution is added in an amount equivalent to an amount three times the acid value of the resin in terms of molar ratio. The resulting liquid mixture is stirred for 30 minutes. Subsequently, the inside of the container is purged with a dry nitrogen gas. While the temperature is maintained to be 40° C. and the liquid mixture is stirred, 400 parts of ion-exchange water is added dropwise to the container at a rate of 2 part/min to perform emulsification. After the addition of the ion-exchange water has been terminated, the resulting emulsion liquid is cooled to 25° C. Hereby, a resin particle dispersion liquid containing resin particles having a volume average particle size of 190 nm is prepared. The solid content in the resin particle dispersion liquid is adjusted to be 20% by the addition of ion-exchange water. Hereby, an amorphous polyester resin particle dispersion liquid (A1) is prepared.

Preparation of Crystalline Resin

Preparation of Crystalline Polyester Resin (B)

1,10-Decanedicarboxylic acid: 265 parts 1,6-Hexanediol: 168 parts

Dibutyltin oxide (catalyst): 0.3 parts

The above constituents are charged into a three-necked flask dried by heating. The air inside the container is replaced with a nitrogen gas by reducing pressure to create an inert atmosphere. Then, stirring and reflux are performed at 180° C. for 5 hours by mechanical stirring. Subsequently, the temperature is gradually increased to 230° C. under reduced pressure. Then, stirring is performed for 2 hours. After the viscosity has been increased to a sufficiently high level, air cooling is performed to stop the reaction. The weight average molecular weight Mw of the resulting crystalline polyester resin (B) measured in the molecular weight measurement (polystyrene equivalent) is 12,700. The melting temperature of the crystalline polyester resin (B) is 73° C.

Preparation of Crystalline Polyester Resin Particle Dispersion Liquid

Preparation of Crystalline Polyester Resin Particle Dispersion Liquid (B1)

With 90 parts of the crystalline polyester resin (B), 1.8 parts of an ionic surfactant "NEOGEN RK" produced by DKS Co. Ltd. and 210 parts of ion-exchange water are mixed. After the resulting mixture has been heated to 120° C., it is dispersed with "ULTRA-TURRAX T50" produced by IKA to a sufficient degree. Subsequently, a dispersion treatment is performed for 1 hour with a pressure-discharge Gaulin homogenizer. Hereby, a crystalline polyester resin particle dispersion liquid (B1) having a volume average particle size of 190 nm and a solid content of 20% is prepared.

Preparation of Colorant Particle Dispersion Liquid

Carbon black "Regal330" produced by Cabot Corporation: 50 parts

Ionic surfactant "NEOGEN RK" produced by DKS Co. Ltd.: 5 parts

Ion-exchange water: 193 parts

The above constituents are mixed with one another. The resulting mixture is treated with "ULTIMIZER" produced by Sugino Machine Limited at 240 MPa for 10 minutes to form a colorant particle dispersion liquid having a solid content of 20%.

Preparation of Release Agent Particle Dispersion Liquid

Preparation of Release Agent Particle Dispersion Liquid (W1)

Ester wax "WEP-5" produced by NOF CORPORATION (melting temperature: 85° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W1, solid content: 20%) in which release agent particles having a volume average particle size of 220 nm are dispersed is prepared.

Preparation of Release Agent Particle Dispersion Liquid (W2)

Ester wax "WEP-9" produced by NOF CORPORATION (melting temperature: 67° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W2, solid content: 20%) in which release agent particles having a volume average particle size of 220 nm are dispersed is prepared.

Preparation of Release Agent Particle Dispersion Liquid (W3)

Ester wax "WEP-2" produced by NOF CORPORATION (melting temperature: 60° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W3, solid content: 20%) in which release agent particles having a volume average particle size of 220 nm are dispersed is prepared.

Preparation of Release Agent Particle Dispersion Liquid (W4)

Paraffin wax "HNP-9" produced by Nippon Seiro Co., Ltd. (melting temperature: 75° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W4, solid content: 20%) in which release agent particles having a volume average particle size of 220 nm are dispersed is prepared.

Preparation of Release Agent Particle Dispersion Liquid (W5)

Polyethylene wax "PW600" produced by Toyo Adl Corporation (melting temperature: 91° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W5, solid content: 20%) in which release agent particles having a volume average particle size of 220 nm are dispersed is prepared.

Preparation of Release Agent Particle Dispersion Liquid (W6)

Paraffin wax "FT-100" produced by Nippon Seiro Co., Ltd. (melting temperature: 98° C.): 100 parts Anionic surfactant "NEOGEN RK produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (W6, solid content: 20%) in which release agent particles having a volume average particle size of 220 nm are dispersed is prepared.

Example 1

Preparation of Toner Particles

- Amorphous polyester resin particle dispersion liquid (A1): 240 parts (solid content: 20%)
- Crystalline polyester resin particle dispersion liquid (B1): 50 parts (solid content: 20%)
- Colorant particle dispersion liquid: 20 parts (solid content: 20%)
- Release agent particle dispersion liquid (W1): 40 parts (solid content: 20%)
- Anionic surfactant "NEOGEN RK" (20%) produced by Dai-ichi Kogyo Seiyaku Co., Ltd.: 2.8 parts
- Ion-exchange water: 215 parts The above constituents are charged into a 3-liter reactor equipped with a thermometer, a pH meter, and a stirrer. While the temperature is controlled from the outside with a mantle heater, the resulting mixture is held for 30 minutes at a temperature of 30° C. and a stirrer rotational speed of 150 rpm. Subsequently, a 0.3 N aqueous nitric acid solution is added to the mixture in order to adjust the pH of the mixture in the aggregation step to be 3.0.

Subsequently, while the mixture is dispersed with a homogenizer "ULTRA-TURRAX T50" produced by IKA Japan, an aqueous polyaluminum chloride (PAC) solution prepared by dissolving 0.7 parts of PAC produced by Oji Paper Co., Ltd. (30% powder product) in 7 parts of ion-exchange water is added to the mixture. Then, while the mixture is stirred, the temperature is increased to 50° C. The size of the resulting aggregated particles is measured with COULTER MULTISIZER II (aperture diameter: 50 μm) produced by Beckman Coulter, Inc. The volume average size of the aggregated particles is set to 4.6 μm. First aggregated particles are prepared in the above-described manner.

Subsequently, 45 parts of the amorphous polyester resin particle dispersion liquid (A1) and 30 parts of the crystalline polyester resin particle dispersion liquid are further added to the dispersion liquid. Hereby, second aggregated particles are prepared. After holding has been performed for 30 minutes, 75 parts of the amorphous polyester resin particle dispersion liquid (A1) is further added to the dispersion liquid. Hereby, third aggregated particles are prepared.

Subsequently, 20 parts of a 10% aqueous solution of nitrilotriacetic acid (NTA) metal salt "CHELEST 70" produced by Chelest Corporation is added to the dispersion liquid. Then, the pH of the dispersion liquid is adjusted to be 9.0 using a 1 N aqueous sodium hydroxide solution.

Then, the temperature is increased to a first coalescence temperature of 70° C., and holding is performed for a first coalescence time of 30 minutes. Hereby, first coalesced particles are prepared. Subsequently, the temperature is slowly reduced to a first final cooling temperature of 63° C. at a first cooling rate of 0.7° C./min. Hereby, first cooled particles are prepared. Then, holding is performed for 30 minutes.

Subsequently, the temperature is increased to a second coalescence temperature of 87° C., and holding is performed for a second coalescence time of 20 minutes. Hereby, second coalesced particles are prepared. Subsequently, the temperature is slowly reduced to a second final cooling temperature of 35° C. at a second cooling rate of 0.7° C./min. While the temperature is maintained at 35° C., holding is performed for a holding time of 30 minutes after second cooling. Hereby, second cooled particles are prepared. Subsequently, filtration is performed. Hereby, coarse toner particles are produced.

The coarse toner particles are again dispersed in ion-exchange water and then filtered. The above treatment is repeated to perform cleaning until the electric conductivity of the filtrate reaches 20 μS/cm or less. Subsequently, vacuum drying is performed in an oven kept at 40° C. for 5 hours. Hereby, toner particles are formed.

Preparation of Toner

With 100 parts of the toner particles, 1.5 parts of hydrophobic silica "RY50" produced by Nippon Aerosil Co., Ltd. is mixed for 30 seconds using a sample mill at 10,000 rpm. The resulting mixture is screened through a vibration sieve having an opening of 45 μm. Hereby, a toner is prepared.

Examples 2 to 32 and Comparative Examples 1 and 2

Toner particles are prepared as in Example 1, except that the amounts and types of the dispersion liquids used, and the conditions under which the first coalesced particles, the first cooled particles, the second coalesced particles, and the second cooled particles are prepared are changed in accordance with Tables 1-1 to 1-3.

Comparative Example 3

- Amorphous polyester resin particle dispersion liquid (A1): 240 parts (solid content: 20%)
- Crystalline polyester resin particle dispersion liquid (B1): 80 parts (solid content: 20%)
- Release agent particle dispersion liquid (W1): 40 parts (solid content: 20%)
- Colorant particle dispersion liquid: 20 parts (solid content: 20%)
- Anionic surfactant "NEOGEN RK" (20%) produced by Dai-ichi Kogyo Seiyaku Co., Ltd.: 2.8 parts
- Ion-exchange water: 215 parts The above constituents are charged into a 3-liter reactor equipped with a thermometer, a pH meter, and a stirrer. While the temperature is controlled from the outside with a mantle heater, the resulting mixture is held for 30 minutes at a temperature of 30° C. and a stirrer rotational speed of 150 rpm. Subsequently, a 0.3 N aqueous nitric acid solution is added to the mixture in order to adjust the pH of the mixture in the aggregation step to be 3.0.

Subsequently, while the mixture is dispersed with a homogenizer "ULTRA-TURRAX T50" produced by IKA Japan, an aqueous polyaluminum chloride (PAC) solution prepared by dissolving 0.7 parts of PAC produced by Oji Paper Co., Ltd. (30% powder product) in 7 parts of ion-exchange water is added to the mixture. Then, while the mixture is stirred, the temperature is increased to 50° C. The size of the resulting aggregated particles is measured with COULTER MULTISIZER II (aperture diameter: 50 μm) produced by Beckman Coulter, Inc. The volume average size of the aggregated particles is set to 4.6 μm. To the resulting dispersion liquid, 120 parts of the amorphous polyester resin particle dispersion liquid (A1) is further added.

Subsequently, 20 parts of a 10% aqueous solution of NTA metal salt "CHELEST 70" produced by Chelest Corporation is added to the dispersion liquid. Then, the pH of the dispersion liquid is adjusted to be 9.0 using a 1 N aqueous sodium hydroxide solution.

Subsequently, the dispersion liquid is heated to 87° C., held for 2 hours, and then slowly cooled to 30° C. at a cooling rate of 0.5° C./min. Furthermore, the dispersion liquid is filtered. Hereby, coarse toner particles are produced.

The coarse toner particles are again dispersed in ion-exchange water and then filtered. The above treatment is repeated to perform cleaning until the electric conductivity of the filtrate reaches 20 μS/cm or less. Subsequently, vacuum drying is performed in an oven kept at 40° C. for 5 hours. Hereby, toner particles are formed.

Comparative Example 4

Toner particles are prepared as in Comparative example 3, except that the release agent particle dispersion liquid (W5) is used instead of the release agent particle dispersion liquid (W1) used in Comparative example 3.

Properties

The following properties of each of the toners prepared in Examples and Comparative examples are determined by the above-described methods.

- Maximum diameter of toner particles
- Diameter of crystalline resin domains
- Aspect ratio or circularity of crystalline resin domains
- Number of crystalline resin domains having a diameter equal to 10% or more and 40% or less of the maximum diameter of the toner particle (in Table 1-4, referred to as "Number of large domains")
- Diameter of release agent domains
- Aspect ratio or circularity of release agent domains
- Number of release agent domains having a diameter equal to 10% or more and 40% or less of the maximum diameter of the toner particle (in Table 1-4, referred to as "Number of large domains")
- Proportion (number %) of toner particles A1 satisfying the conditions (A1) and (B1) to all the toner particles (100 toner particles measured)
- Proportion (number %) of toner particles B1 satisfying the conditions (A1), (B1), and (C11) to all the toner particles (100 toner particles measured)
- Proportion (number %) of toner particles C1 satisfying the conditions (A1), (B1), and (C21) to all the toner particles (100 toner particles measured)
- Proportion (number %) of toner particles D1 satisfying the conditions (A1), (B1), and (C12) to all the toner particles (100 toner particles measured)
- Proportion (number %) of toner particles E1 satisfying the conditions (A1), (B1), and (C22) to all the toner particles (100 toner particles measured)
- Proportion (number %) of toner particles A2 satisfying the conditions (A2) and (B2) to all the toner particles (100 toner particles measured)
- Proportion (number %) of toner particles B2 satisfying the conditions (A2), (B2), and (C11) to all the toner particles (100 toner particles measured)
- Proportion (number %) of toner particles C2 satisfying the conditions (A2), (B2), and (C21) to all the toner particles (100 toner particles measured)
- Proportion (number %) of toner particles D2 satisfying the conditions (A2), (B2), and (C12) to all the toner particles (100 toner particles measured)
- Proportion (number %) of toner particles E2 satisfying the conditions (A2), (B2), and (C22) to all the toner particles (100 toner particles measured)

Details of the above conditions are as described below.

Condition (A1): one or more domains of the crystalline resin, the domains having a diameter equal to 10% or more and 40% or less of the maximum diameter of the toner particle, are present in the toner particle.

Condition (B1): one or more domains of the release agent, the domains having a diameter equal to 10% or more and 40% or less of the maximum diameter of the toner particle, are present in the toner particle.

Condition (A2): a plurality of domains of the crystalline resin, the domains having a diameter equal to 10% or more and 40% or less of the maximum diameter of the toner particle, are present in the toner particle.

Condition (B2): a plurality of domains of the release agent, the domains having a diameter equal to 10% or more and 40% or less of the maximum diameter of the toner particle, are present in the toner particle.

Condition (C11): the domains of the crystalline resin are acicular or tabular domains having an aspect ratio of 5 or more and 40 or less and the domains of the release agent are circular domains having a circularity of 0.92 or more and 1.00 or less.

Condition (C21): the domains of the crystalline resin are circular domains having a circularity of 0.92 or more and 1.00 or less and the domains of the release agent are acicular or tabular domains having an aspect ratio of 5 or more and 40 or less.

Condition (C12): the domains of the crystalline resin are acicular or tabular domains having an aspect ratio of 15 or more and 40 or less and the domains of the release agent are circular domains having a circularity of 0.95 or more and 1.00 or less.

Condition (C22): the domains of the crystalline resin are circular domains having a circularity of 0.95 or more and 1.00 or less and the domains of the release agent are acicular or tabular domains having an aspect ratio of 15 or more and 40 or less.

Table 1-4 lists the arrangement of crystalline resin domains and release agent domains included in representative toner particles. Details are as described below.

Evaluations

Preparation of Developer

A developer is prepared using a specific one of the toners prepared in Examples and Comparative examples.

With a Henschel mixer, 500 parts of spherical magnetite powder particles (volume average particle size: 0.55 μm) are stirred to a sufficient degree. Subsequently, 5.0 parts of a titanate coupling agent is added to the magnetite powder particles. After the temperature has been increased to 100° C., stirring is performed for 30 minutes. Hereby, spherical magnetite particles coated with a titanate coupling agent are prepared.

Into a four-necked flask, 6.25 parts of phenol, 9.25 parts of 35% formalin, 500 parts of the magnetite particles, 6.25 parts of 25% ammonia water, and 425 parts of water are charged. The resulting mixture is stirred. After the reaction has been conducted at 85° C. for 120 minutes while being stirred, the temperature is reduced to 25° C. Then, 500 parts of water is added to the reaction solution. Subsequently, the supernatant is removed, and the precipitate is washed with water. The precipitate is dried at 150° C. or more and 180° C. or less at reduced pressure. Hereby, carrier particles having an average size of 35 μm are prepared.

A specific one of the toners prepared in Examples and Comparative examples and the above carrier are charged into a V-blender at proportions of [Toner]:[Carrier]=5:95 by mass. The resulting mixture is stirred for 20 minutes to form a developer.

Difference in Gloss of Image

Each of the developers is evaluated in terms of difference in gloss of image in the following manner.

A specific one of the developers prepared in Examples and Comparative examples is charged into a developing device of an image forming apparatus "DocuCentrecolor 400" produced by Fuji Xerox Co., Ltd. Using the above image forming apparatus, at a temperature of 28° C. and a humidity of 85% RH, 50 plain paper sheets "CS-520 A3" produced by Canon Inc. are ejected at a processing speed of 308 mm/s and a fixing temperature of 150° C. without any image formed on the paper sheets. Subsequently, a solid image having a length of 50 mm, a width of 280 mm, and an area coverage of 100% is formed on the front-end portions of 10 A3-paper sheets at a toner deposition density (TMA) of 10.0 g/m$^2$. The gloss values of the solid images formed on the first and tenth plain paper sheets are measured by the following method.

In the measurement of gloss, 60-degree gloss is measured at five points using a portable glossmeter "BYK-Gardner micro-TRI-gloss" produced by Toyo Seiki Seisaku-sho, Ltd.

The difference in the gloss values measured is evaluated in accordance with the following standards.

A: The difference between the maximum and minimum gloss values of the images formed on the first and tenth sheets is less than 3°.

B: The difference between the maximum and minimum gloss values of the images formed on the first and tenth sheets is less than 4°.

C: The difference between the maximum and minimum gloss values of the images formed on the first and tenth sheets is less than 6°.

D: The difference between the maximum and minimum gloss values of the images formed on the first and tenth sheets is less than 8°.

E: The difference between the maximum and minimum gloss values of the images formed on the first and tenth sheets is less than 10°.

F: The difference between the maximum and minimum gloss values of the images formed on the first and tenth sheets is 10° or more.

TABLE 1-1

| | Toner particles Maximum diameter | First aggregated particles | | | | | |
|---|---|---|---|---|---|---|---|
| | | Amount of amorphous polyester resin particle dispersion liquid | Amount of crystalline polyester resin particle dispersion liquid | Type of release agent particle dispersion liquid | | Amount of release agent particle dispersion liquid | Amount of pigment particle dispersion liquid |
| | μm | Part | Part | — | | Part | Part |
| Example 1 | 5.7 | 240 | 50 | W1 | Ester wax | 40 | 20 |
| Example 2 | 5.7 | 240 | 50 | W1 | Ester wax | 40 | 20 |
| Example 3 | 5.7 | 240 | 50 | W1 | Ester wax | 40 | 20 |
| Example 4 | 5.8 | 260 | 50 | W1 | Ester wax | 20 | 20 |
| Example 5 | 5.8 | 260 | 50 | W1 | Ester wax | 20 | 20 |
| Example 6 | 5.8 | 260 | 50 | W1 | Ester wax | 20 | 20 |
| Example 7 | 5.7 | 220 | 50 | W1 | Ester wax | 60 | 20 |
| Example 8 | 5.7 | 220 | 50 | W1 | Ester wax | 60 | 20 |
| Example 9 | 5.7 | 220 | 50 | W1 | Ester wax | 60 | 20 |
| Example 10 | 5.7 | 240 | 50 | W2 | Ester wax | 60 | 20 |
| Example 11 | 5.7 | 240 | 50 | W3 | Ester wax | 60 | 20 |
| Example 12 | 5.8 | 280 | 25 | W1 | Ester wax | 40 | 20 |
| Example 13 | 5.8 | 280 | 25 | W1 | Ester wax | 40 | 20 |
| Example 14 | 5.8 | 280 | 25 | W1 | Ester wax | 40 | 20 |
| Example 15 | 5.8 | 220 | 70 | W1 | Ester wax | 40 | 20 |
| Example 16 | 5.8 | 220 | 70 | W1 | Ester wax | 40 | 20 |
| Example 17 | 5.8 | 220 | 70 | W1 | Ester wax | 40 | 20 |
| Example 18 | 5.7 | 240 | 80 | W5 | Polyethylene wax | 10 | 20 |
| Example 19 | 5.7 | 240 | 80 | W5 | Polyethylene wax | 10 | 20 |
| Example 20 | 5.7 | 240 | 80 | W5 | Polyethylene wax | 10 | 20 |
| Example 21 | 5.7 | 280 | 40 | W5 | Polyethylene wax | 10 | 20 |
| Example 22 | 5.7 | 280 | 40 | W5 | Polyethylene wax | 10 | 20 |
| Example 23 | 5.7 | 280 | 40 | W5 | Polyethylene wax | 10 | 20 |
| Example 24 | 5.7 | 220 | 100 | W5 | Polyethylene wax | 10 | 20 |
| Example 25 | 5.7 | 220 | 100 | W5 | Polyethylene wax | 10 | 20 |
| Example 26 | 5.7 | 220 | 100 | W5 | Polyethylene wax | 10 | 20 |
| Example 27 | 5.7 | 240 | 80 | W4 | Paraffin wax | 10 | 20 |
| Example 28 | 5.7 | 240 | 80 | W6 | Paraffin wax | 10 | 20 |
| Example 29 | 4.8 | 240 | 50 | W1 | Ester wax | 40 | 20 |
| Example 30 | 4.8 | 240 | 50 | W1 | Ester wax | 40 | 20 |
| Example 31 | 7 | 240 | 50 | W1 | Ester wax | 40 | 20 |
| Example 32 | 7 | 240 | 50 | W1 | Ester wax | 40 | 20 |
| Comparative example 1 | 5.8 | 240 | 50 | W1 | Ester wax | 40 | 20 |
| Comparative example 2 | 5.8 | 240 | 50 | W1 | Ester wax | 40 | 20 |
| Comparative example 3 | 5.8 | 240 | 80 | W1 | Ester wax | 40 | 20 |
| Comparative example 4 | 5.8 | 240 | 80 | W5 | Polyethylene wax | 40 | 20 |

TABLE 1-2

| | Second aggregated particles | | | | | Third aggregated particles |
|---|---|---|---|---|---|---|
| | Amount of amorphous polyester resin particle dispersion liquid | Amount of crystalline polyester resin particle dispersion liquid | Type of release agent particle dispersion liquid | | Amount of release agent particle dispersion liquid | Amount of amorphous polyester resin particle dispersion liquid |
| | Part | Part | — | | Part | Part |
| Example 1 | 45 | 30 | — | — | — | 75 |
| Example 2 | 45 | 30 | — | — | — | 75 |
| Example 3 | 45 | 30 | — | — | — | 75 |
| Example 4 | 45 | 30 | — | — | — | 75 |
| Example 5 | 45 | 30 | — | — | — | 75 |
| Example 6 | 45 | 30 | — | — | — | 75 |
| Example 7 | 45 | 30 | — | — | — | 75 |
| Example 8 | 45 | 30 | — | — | — | 75 |
| Example 9 | 45 | 30 | — | — | — | 75 |
| Example 10 | 45 | 30 | — | — | — | 75 |
| Example 11 | 45 | 30 | — | — | — | 75 |
| Example 12 | 45 | 15 | — | — | — | 75 |
| Example 13 | 45 | 15 | — | — | — | 75 |
| Example 14 | 45 | 15 | — | — | — | 75 |
| Example 15 | 45 | 30 | — | — | — | 75 |
| Example 16 | 45 | 30 | — | — | — | 75 |
| Example 17 | 45 | 30 | — | — | — | 75 |
| Example 18 | 45 | — | W5 | Polyethylene wax | 30 | 75 |
| Example 19 | 45 | — | W5 | Polyethylene wax | 30 | 75 |
| Example 20 | 45 | — | W5 | Polyethylene wax | 30 | 75 |
| Example 21 | 45 | — | W5 | Polyethylene wax | 30 | 75 |
| Example 22 | 45 | — | W5 | Polyethylene wax | 30 | 75 |
| Example 23 | 45 | — | W5 | Polyethylene wax | 30 | 75 |
| Example 24 | 45 | — | W5 | Polyethylene wax | 30 | 75 |
| Example 25 | 45 | — | W5 | Polyethylene wax | 30 | 75 |
| Example 26 | 45 | — | W5 | Polyethylene wax | 30 | 75 |
| Example 27 | 45 | — | W4 | Paraffin wax | 30 | 75 |
| Example 28 | 45 | — | W6 | Paraffin wax | 30 | 75 |
| Example 29 | 45 | 30 | — | — | — | 75 |
| Example 30 | 45 | 30 | — | — | — | 75 |
| Example 31 | 45 | 30 | — | — | — | 75 |
| Example 32 | 45 | 30 | — | — | — | 75 |
| Comparative example 1 | 45 | 30 | — | — | — | 75 |
| Comparative example 2 | 45 | 30 | — | — | — | 75 |
| Comparative example 3 | 120 | — | — | — | — | — |
| Comparative example 4 | 120 | — | — | — | — | — |

TABLE 1-3

| | First coalesced particles | | First cooled particles | | Second coalesced particles | | Second cooled particles | | |
|---|---|---|---|---|---|---|---|---|---|
| | First coalescence temperature ° C. | First coalescence time min | First cooling rate ° C./min | First final cooling temperature ° C. | Second coalescence temperature ° C. | Second coalescence time min | Second cooling rate ° C./min | Second final cooling temperature ° C. | Holding time after second cooling min |
| Example 1 | 70 | 30 | 0.7 | 63 | 87 | 20 | 0.7 | 35 | 30 |
| Example 2 | 70 | 30 | 0.5 | 63 | 87 | 40 | 0.5 | 35 | 30 |
| Example 3 | 70 | 30 | 0.3 | 63 | 87 | 60 | 0.3 | 35 | 30 |
| Example 4 | 70 | 30 | 0.7 | 63 | 87 | 20 | 0.7 | 35 | 30 |
| Example 5 | 70 | 30 | 0.5 | 63 | 87 | 40 | 0.5 | 35 | 30 |
| Example 6 | 70 | 30 | 0.3 | 63 | 87 | 60 | 0.3 | 35 | 30 |
| Example 7 | 70 | 30 | 0.7 | 63 | 87 | 20 | 0.7 | 35 | 30 |
| Example 8 | 70 | 30 | 0.5 | 63 | 87 | 40 | 0.5 | 35 | 30 |
| Example 9 | 70 | 30 | 0.3 | 63 | 87 | 60 | 0.3 | 35 | 30 |
| Example 10 | 70 | 30 | 0.5 | 63 | 87 | 40 | 0.5 | 35 | 30 |
| Example 11 | 70 | 30 | 0.5 | 63 | 87 | 40 | 0.5 | 35 | 30 |
| Example 12 | 70 | 30 | 0.7 | 63 | 87 | 20 | 0.7 | 35 | 30 |
| Example 13 | 70 | 30 | 0.5 | 63 | 87 | 40 | 0.5 | 35 | 30 |
| Example 14 | 70 | 30 | 0.3 | 63 | 87 | 60 | 0.3 | 35 | 30 |

TABLE 1-3-continued

| | First coalesced particles | | First cooled particles | | Second coalesced particles | | Second cooled particles | | |
|---|---|---|---|---|---|---|---|---|---|
| | First coalescence temperature ° C. | First coalescence time min | First cooling rate ° C./min | First final cooling temperature ° C. | Second coalescence temperature ° C. | Second coalescence time min | Second cooling rate ° C./min | Second final cooling temperature ° C. | Holding time after second cooling min |
| Example 15 | 70 | 30 | 0.7 | 63 | 87 | 20 | 0.7 | 35 | 30 |
| Example 16 | 70 | 30 | 0.5 | 63 | 87 | 40 | 0.5 | 35 | 30 |
| Example 17 | 70 | 30 | 0.3 | 63 | 87 | 60 | 0.3 | 35 | 30 |
| Example 18 | 85 | 60 | 1 | 40 | 75 | 120 | 2 | 45 | 30 |
| Example 19 | 85 | 60 | 0.5 | 40 | 75 | 120 | 2 | 35 | 30 |
| Example 20 | 85 | 60 | 0.3 | 40 | 75 | 120 | 2 | 25 | 30 |
| Example 21 | 85 | 60 | 1 | 40 | 75 | 120 | 2 | 45 | 30 |
| Example 22 | 85 | 60 | 0.5 | 40 | 75 | 120 | 2 | 35 | 30 |
| Example 23 | 85 | 60 | 0.3 | 40 | 75 | 120 | 2 | 25 | 30 |
| Example 24 | 85 | 60 | 1 | 40 | 75 | 120 | 2 | 45 | 30 |
| Example 25 | 85 | 60 | 0.5 | 40 | 75 | 120 | 2 | 35 | 30 |
| Example 26 | 85 | 60 | 0.3 | 40 | 75 | 120 | 2 | 25 | 30 |
| Example 27 | 85 | 60 | 0.5 | 40 | 70 | 120 | 2 | 35 | 30 |
| Example 28 | 85 | 60 | 0.5 | 40 | 75 | 120 | 2 | 35 | 30 |
| Example 29 | 70 | 30 | 0.7 | 63 | 87 | 20 | 0.7 | 35 | 30 |
| Example 30 | 70 | 30 | 0.3 | 63 | 87 | 60 | 0.3 | 35 | 30 |
| Example 31 | 70 | 30 | 0.7 | 63 | 87 | 20 | 0.7 | 35 | 30 |
| Example 32 | 70 | 30 | 0.3 | 63 | 87 | 60 | 0.3 | 35 | 30 |
| Comparative example 1 | 70 | 30 | 0.5 | 69 | 87 | 40 | 0.5 | 35 | 3 |
| Comparative example 2 | 70 | 30 | 0.5 | 63 | 87 | 20 | 5 | 35 | 30 |
| Comparative example 3 | 87 | 120 | — | — | — | — | 0.5 | 35 | 3 |
| Comparative example 4 | 87 | 120 | — | — | — | — | 0.5 | 35 | 3 |

TABLE 1-4

| | Arrangement of representative crystalline resin domains | | | | | Arrangement of representative release agent domains | | | | |
|---|---|---|---|---|---|---|---|---|---|---|
| | Domain diameter μm | Ratio of domain diameter to maximum diameter of toner particle % | Aspect ratio | Circularity | Number of large domains — | Domain diameter μm | Ratio of domain diameter to maximum diameter of toner particle % | Aspect ratio | Circularity | Number of large domains — |
| Example 1 | 1.1 | 19 | 18 | — | 6 | 0.8 | 14 | — | 0.97 | 4 |
| Example 2 | 1.3 | 23 | 23 | — | 6 | 1.3 | 23 | — | 0.97 | 3 |
| Example 3 | 1.9 | 33 | 28 | — | 6 | 1.6 | 28 | — | 0.97 | 3 |
| Example 4 | 1.1 | 19 | 20 | — | 6 | 0.7 | 12 | — | 0.97 | 2 |
| Example 5 | 1.4 | 24 | 25 | — | 6 | 1.2 | 21 | — | 0.97 | 2 |
| Example 6 | 1.8 | 31 | 33 | — | 5 | 1.8 | 31 | — | 0.97 | 2 |
| Example 7 | 1.2 | 21 | 20 | — | 6 | 1 | 18 | — | 0.97 | 4 |
| Example 8 | 1.4 | 25 | 26 | — | 6 | 1.6 | 28 | — | 0.97 | 3 |
| Example 9 | 1.9 | 33 | 28 | — | 6 | 2.1 | 37 | — | 0.97 | 3 |
| Example 10 | 1.3 | 23 | 24 | — | 6 | 1.4 | 25 | — | 0.98 | 3 |
| Example 11 | 1.4 | 25 | 25 | — | 6 | 1.5 | 26 | — | 0.98 | 3 |
| Example 12 | 1.2 | 21 | 20 | — | 4 | 0.8 | 14 | — | 0.97 | 4 |
| Example 13 | 1.5 | 26 | 23 | — | 4 | 1.4 | 24 | — | 0.97 | 3 |
| Example 14 | 1.8 | 31 | 29 | — | 3 | 1.8 | 31 | — | 0.97 | 3 |
| Example 15 | 1.1 | 19 | 18 | — | 7 | 0.7 | 12 | — | 0.97 | 4 |
| Example 16 | 1.4 | 24 | 21 | — | 7 | 1.1 | 19 | — | 0.97 | 3 |
| Example 17 | 1.8 | 31 | 28 | — | 6 | 1.6 | 28 | — | 0.97 | 3 |
| Example 18 | 0.6 | 11 | — | 0.85 | 3 | 1.2 | 21 | 14 | — | 5 |
| Example 19 | 0.8 | 14 | — | 0.87 | 3 | 1.5 | 26 | 18 | — | 5 |
| Example 20 | 1.1 | 19 | — | 0.93 | 3 | 1.8 | 32 | 23 | — | 4 |
| Example 21 | 0.6 | 11 | — | 0.82 | 2 | 1.3 | 23 | 15 | — | 5 |
| Example 22 | 0.7 | 12 | — | 0.88 | 2 | 1.6 | 28 | 20 | — | 5 |
| Example 23 | 1 | 18 | — | 0.93 | 2 | 1.9 | 33 | 25 | — | 4 |
| Example 24 | 0.8 | 14 | — | 0.84 | 3 | 1.2 | 21 | 14 | — | 5 |
| Example 25 | 1.1 | 19 | — | 0.86 | 3 | 1.4 | 25 | 19 | — | 5 |
| Example 26 | 1.3 | 23 | — | 0.93 | 3 | 1.8 | 32 | 28 | — | 5 |
| Example 27 | 0.9 | 16 | | 0.85 | 3 | 1.5 | 26 | 21 | — | 5 |
| Example 28 | 0.8 | 14 | — | 0.85 | 3 | 1.6 | 28 | 24 | — | 4 |
| Example 29 | 1.1 | 23 | 18 | — | 4 | 0.7 | 15 | — | 0.97 | 3 |

TABLE 1-4-continued

| | Arrangement of representative crystalline resin domains | | | | | Arrangement of representative release agent domains | | | | |
|---|---|---|---|---|---|---|---|---|---|---|
| | Domain diameter μm | Ratio of domain diameter to maximum diameter of toner particle % | Aspect ratio | Circularity | Number of large domains — | Domain diameter μm | Ratio of domain diameter to maximum diameter of toner particle % | Aspect ratio | Circularity | Number of large domains — |
| Example 30 | 1.9 | 40 | 29 | — | 4 | 1.7 | 35 | — | 0.97 | 3 |
| Example 31 | 1.0 | 14 | 19 | — | 5 | 0.8 | 11 | — | 0.97 | 5 |
| Example 32 | 1.9 | 27 | 30 | — | 5 | 1.6 | 23 | — | 0.97 | 5 |
| Comparative example 1 | 0.3 | 5 | 8 | — | 0 | 1.3 | 22 | — | 0.97 | 3 |
| Comparative example 2 | 1.4 | 24 | 25 | — | 6 | 0.5 | 9 | — | 0.93 | 0 |
| Comparative example 3 | 0.3 | 5 | 6 | — | 0 | 1.6 | 28 | — | 0.97 | 0 |
| Comparative example 4 | 0.3 | 5 | 6 | — | 0 | 1.2 | 21 | 18 | — | 0 |

TABLE 1-5

| | Proportion of toner particles satisfying the conditions (number %) | | | | | | | | | | |
|---|---|---|---|---|---|---|---|---|---|---|---|
| | Toner particles A1 satisfying conditions A1 and B1 | Toner particles B1 satisfying conditions A1, B1, and C11 | Toner particles C1 satisfying conditions A1, B1, and C21 | Toner particles D1 satisfying conditions A1, B1, and C12 | Toner particles E1 satisfying conditions A1, B1, and C22 | Toner particles A2 satisfying conditions A2 and B2 | Toner particles B2 satisfying conditions A2, B2, and C11 | Toner particles C2 satisfying conditions A2, B2, and C21 | Toner particles D2 satisfying conditions A2, B2, and C12 | Toner particles E2 satisfying conditions A2, B2, and C22 | Evaluation Difference in image gloss |
| Example 1 | 34 | 34 | 0 | 11 | 0 | 34 | 34 | 0 | 11 | 0 | C |
| Example 2 | 78 | 78 | 0 | 53 | 0 | 71 | 71 | 0 | 45 | 0 | A |
| Example 3 | 82 | 82 | 0 | 73 | 0 | 41 | 41 | 0 | 40 | 0 | B |
| Example 4 | 28 | 28 | 0 | 0 | 0 | 18 | 18 | 0 | 0 | 0 | C |
| Example 5 | 62 | 62 | 0 | 46 | 0 | 33 | 33 | 0 | 21 | 0 | B |
| Example 6 | 77 | 77 | 0 | 68 | 0 | 35 | 35 | 0 | 23 | 0 | B |
| Example 7 | 47 | 47 | 0 | 43 | 0 | 46 | 46 | 0 | 23 | 0 | B |
| Example 8 | 81 | 81 | 0 | 74 | 0 | 80 | 80 | 0 | 72 | 0 | A |
| Example 9 | 83 | 83 | 0 | 77 | 0 | 82 | 82 | 0 | 75 | 0 | A |
| Example 10 | 73 | 73 | 0 | 48 | 0 | 68 | 68 | 0 | 45 | 0 | D |
| Example 11 | 76 | 76 | 0 | 49 | 0 | 71 | 71 | 0 | 48 | 0 | E |
| Example 12 | 25 | 25 | 0 | 9 | 0 | 25 | 25 | 0 | 9 | 0 | C |
| Example 13 | 73 | 73 | 0 | 48 | 0 | 68 | 68 | 0 | 42 | 0 | A |
| Example 14 | 77 | 77 | 0 | 71 | 0 | 33 | 33 | 0 | 28 | 0 | B |
| Example 15 | 18 | 18 | 0 | 10 | 0 | 18 | 18 | 0 | 10 | 0 | D |
| Example 16 | 76 | 76 | 0 | 62 | 0 | 72 | 72 | 0 | 58 | 0 | A |
| Example 17 | 83 | 83 | 0 | 75 | 0 | 52 | 52 | 0 | 51 | 0 | B |
| Example 18 | 12 | 0 | 0 | 0 | 0 | 12 | 0 | 0 | 0 | 0 | D |
| Example 19 | 32 | 0 | 0 | 0 | 0 | 32 | 0 | 0 | 0 | 0 | D |
| Example 20 | 73 | 0 | 18 | 0 | 0 | 73 | 0 | 18 | 0 | 0 | B |
| Example 21 | 10 | 0 | 0 | 0 | 0 | 6 | 0 | 0 | 0 | 0 | E |
| Example 22 | 17 | 0 | 0 | 0 | 0 | 11 | 0 | 0 | 0 | 0 | E |
| Example 23 | 73 | 0 | 32 | 0 | 0 | 42 | 0 | 23 | 0 | 0 | C |
| Example 24 | 16 | 0 | 0 | 0 | 0 | 15 | 0 | 0 | 0 | 0 | E |
| Example 25 | 36 | 0 | 0 | 0 | 0 | 33 | 0 | 0 | 0 | 0 | D |
| Example 26 | 78 | 0 | 33 | 0 | 0 | 72 | 0 | 28 | 0 | 0 | B |
| Example 27 | 38 | 0 | 0 | 0 | 0 | 31 | 0 | 0 | 0 | 0 | C |
| Example 28 | 43 | 0 | 0 | 0 | 0 | 0 | 0 | 0 | 0 | 0 | E |
| Example 29 | 53 | 53 | 0 | 46 | 0 | 53 | 53 | 0 | 46 | 0 | B |
| Example 30 | 83 | 83 | 0 | 72 | 0 | 72 | 72 | 0 | 58 | 0 | A |
| Example 31 | 32 | 32 | 0 | 0 | 0 | 32 | 32 | 0 | 0 | 0 | C |
| Example 32 | 79 | 79 | 0 | 71 | 0 | 79 | 79 | 0 | 55 | 0 | A |
| Comparative example 1 | 0 | 0 | 0 | 0 | 0 | 0 | 0 | 0 | 0 | 0 | F |
| Comparative example 2 | 0 | 0 | 0 | 0 | 0 | 0 | 0 | 0 | 0 | 0 | F |
| Comparative example 3 | 0 | 0 | 0 | 0 | 0 | 0 | 0 | 0 | 0 | 0 | F |
| Comparative example 4 | 0 | 0 | 0 | 0 | 0 | 0 | 0 | 0 | 0 | 0 | F |

The above results confirm that the toners prepared in Examples reduce the difference in gloss between the first and tenth images formed on thin recording media and fixed at a high speed and a low temperature, compared with the toners prepared in Comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner comprising a toner particle including:

an amorphous polyester resin;

a crystalline resin; and a release agent, wherein when a cross section of the toner particle is observed, the toner particle satisfies conditions (A1) and (B1) below, Condition (A1): one or more domains of the crystalline resin, the domains having a diameter equal to 10% or more and 40% or less of a maximum diameter of the toner particle, are present in the toner particle, Condition (B1): one or more domains of the release agent, the domains having a diameter equal to 10% or more and 40% or less of the maximum diameter of the toner particle, are present in the toner particle; and wherein a domain diameter of the crystalline resin is 1.1 μm or more and 2.0 μm or less, wherein a proportion of the toner particles satisfying conditions (A1) and (B1) to all toner particles is 43% or more, and wherein the release agent is an ester wax having a melting temperature of 85° C. or more and 95° C. or less or a polyethylene wax having a melting temperature of 91° C.

2. The electrostatic image developing toner according to claim 1, wherein, when the cross section of the toner particle is observed, the toner particle satisfies conditions (A2) and (B2) below, Condition (A2): a plurality of domains of the crystalline resin, the domains having a diameter equal to 10% or more and 40% or less of the maximum diameter of the toner particle, are present in the toner particle, and Condition (B2): a plurality of domains of the release agent, the domains having a diameter equal to 10% or more and 40% or less of the maximum diameter of the toner particle, are present in the toner particle.

3. The electrostatic image developing toner according to claim 1, wherein, when the cross section of the toner particle is observed, the toner particle satisfies condition (C1) below, Condition (C1): the domains of the crystalline resin are acicular or tabular and the domains of the release agent are circular.

4. The electrostatic image developing toner according to claim 1, wherein, when the cross section of the toner particle is observed, the toner particle satisfies condition (C2) below, Condition (C2): the domains of the crystalline resin are circular and the domains of the release agent are acicular or tabular.

5. The electrostatic image developing toner according to claim 3, wherein the acicular or tabular domains have an aspect ratio of 5 or more and 40 or less, and the circular domains have a circularity of 0.92 or more and 1.00 or less.

6. The electrostatic image developing toner according to claim 1, wherein the proportion of the toner particles satisfying conditions (A1) and (B1) to all toner particles in the toner is 70% or more.

7. An electrostatic image developer comprising:

the electrostatic image developing toner according to claim 1.

8. A toner cartridge detachably attachable to an image forming apparatus, the toner cartridge comprising:

the electrostatic image developing toner according to claim 1.

9. The electrostatic image developing toner according to claim 1, wherein the crystalline resin is a single type of crystalline resin in the toner particle.

10. The electrostatic image developing toner according to claim 1, wherein a domain diameter of the release agent is 0.8 μm or more and 2.0 μm or less.

11. The electrostatic image developing toner according to claim 1, wherein a domain diameter of the release agent is 1.0 μm or more and 2.0 μm or less.

12. The electrostatic image developing toner according to claim 1, wherein the crystalline resin is a crystalline polyester resin, which is a condensation polymer of a polyvalent carboxylic acid and an aliphatic diol, the aliphatic diol comprising 80% by mol or more of an aliphatic diols having 7 to 20 carbon atoms.

13. The electrostatic image developing toner according to claim 1, wherein the release agent is an ester wax having a melting temperature of 85° C. or more and 95° C. or less.

* * * * *